US010750548B2

(12) United States Patent
Roquemore, III et al.

(10) Patent No.: US 10,750,548 B2
(45) Date of Patent: *Aug. 18, 2020

(54) OUT OF BAND DIAGNOSTICS AND MAINTENANCE

(71) Applicant: ABL IP HOLDING LLC, Conyers, GA (US)

(72) Inventors: John Peter Roquemore, III, Suwanee, GA (US); Tyler B. Fultz, Atlanta, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/042,485

(22) Filed: Jul. 23, 2018

(65) Prior Publication Data
US 2018/0332638 A1    Nov. 15, 2018

Related U.S. Application Data

(63) Continuation of application No. 15/215,846, filed on Jul. 21, 2016, now Pat. No. 10,057,931.

(51) Int. Cl.
| | | |
|---|---|---|
| *H04L 12/28* | (2006.01) | |
| *H04W 76/10* | (2018.01) | |
| *H04M 11/00* | (2006.01) | |
| *H04L 29/08* | (2006.01) | |
| *H05B 47/19* | (2020.01) | |
| *H04L 12/26* | (2006.01) | |
| *H04W 48/16* | (2009.01) | |
| *H04W 24/04* | (2009.01) | |
| *H04W 88/02* | (2009.01) | |

(52) U.S. Cl.
CPC .............. *H04W 76/10* (2018.02); *H04L 43/08* (2013.01); *H04L 67/125* (2013.01); *H04L 67/141* (2013.01); *H04M 11/00* (2013.01); *H04W 48/16* (2013.01); *H05B 47/19* (2020.01); *H04W 24/04* (2013.01); *H04W 88/02* (2013.01)

(58) Field of Classification Search
CPC ......... H04L 41/12; H04L 45/02; H04L 45/00; H04L 45/04; H04L 41/04
See application file for complete search history.

(56) References Cited

U.S. PATENT DOCUMENTS

| | | | |
|---|---|---|---|
| 8,035,320 B2 | 10/2011 | Sibert | |
| 2004/0255004 A1* | 12/2004 | Weseloh | G06F 21/6218 709/217 |
| 2009/0278479 A1 | 11/2009 | Platner et al. | |

(Continued)

OTHER PUBLICATIONS

IEEE 802.15.4—Wikipedia, the free encyclopedia, downloaded at https://en./wiki/IEEE_802.15.4, dated Oct. 7, 2016, 7 pages.

(Continued)

*Primary Examiner* — Siren Wei
(74) *Attorney, Agent, or Firm* — RatnerPrestia

(57) ABSTRACT

A method for performing out of band diagnostics and maintenance of lighting system elements. An out of band connection is established via a wireless out of band channel with one of the lighting system elements and the mobile device. The wireless out of band channel is separate and distinct from a wireless lighting operations channel of a wireless lighting control network connecting the lighting system elements.

20 Claims, 16 Drawing Sheets

(56) References Cited

U.S. PATENT DOCUMENTS

| | | | |
|---|---|---|---|
| 2010/0161815 A1* | 6/2010 | Pettissalo | G08C 17/00 |
| | | | 709/228 |
| 2011/0068900 A1 | 3/2011 | Billig et al. | |
| 2011/0288658 A1 | 11/2011 | Walters et al. | |
| 2012/0136485 A1 | 5/2012 | Weber et al. | |
| 2014/0089912 A1 | 3/2014 | Wang et al. | |
| 2014/0285113 A1 | 9/2014 | Huang | |
| 2014/0323048 A1 | 10/2014 | Kang | |
| 2014/0354161 A1 | 12/2014 | Aggarwal et al. | |
| 2015/0043425 A1 | 2/2015 | Aggarwal et al. | |
| 2015/0130359 A1 | 5/2015 | Bosua et al. | |
| 2015/0147067 A1 | 5/2015 | Ryan et al. | |
| 2015/0195883 A1 | 7/2015 | Harris et al. | |
| 2015/0264781 A1 | 9/2015 | Juslén | |
| 2015/0351205 A1* | 12/2015 | Clark | H05B 47/105 |
| | | | 315/149 |
| 2016/0219502 A1 | 7/2016 | Breton | |
| 2016/0219676 A1 | 7/2016 | Mohan et al. | |
| 2016/0359375 A1* | 12/2016 | Lee | H02J 50/12 |

OTHER PUBLICATIONS

Non Final Office Action for U.S. Appl. No. 15/214,944, dated Dec. 30, 2016, 18 pages.

Non Final Office Action for U.S. Appl. No. 15/715,808, dated Nov. 17, 2017, 18 pages.

Notice of Allowance for U.S. Appl. No. 15/214,944, dated Jun. 29, 2017, 20 pages.

Notice of Allowance for U.S. Appl. No. 15/715,808, dated Mar. 12, 2018, 14 pages.

Silicon Labs, EFR32xG1 Wireless Gecko Reference Manual, pp. 1-12, 186-193, 968-993 and search resutls listing Jul. 6, 2016 date for this Manual (49 pages total).

Notice of Allowance for U.S. Appl. No. 16/018,678, dated Sep. 6, 2018, 12 pages.

Entire patent prosecution history of U.S. Appl. No. 15/215,846, filed Jul. 21, 2016, entitled "Out of Band Diagnostics and Maintenance.".

\* cited by examiner

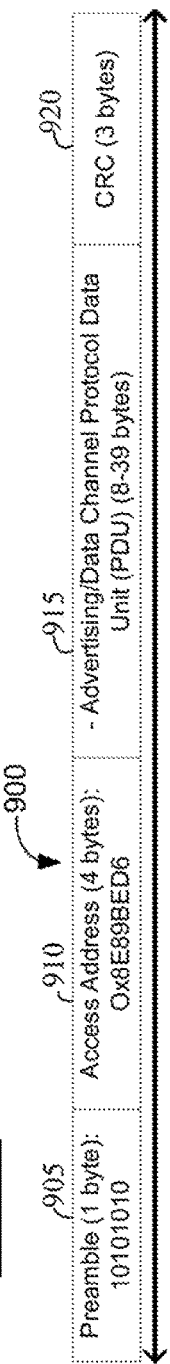
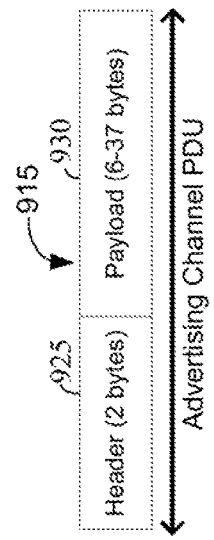
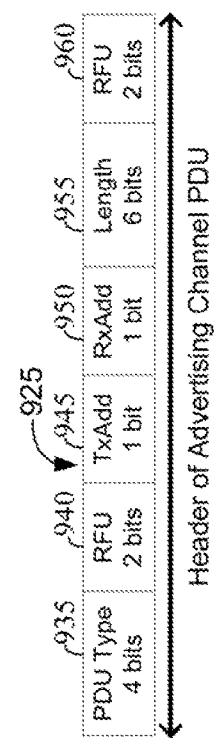
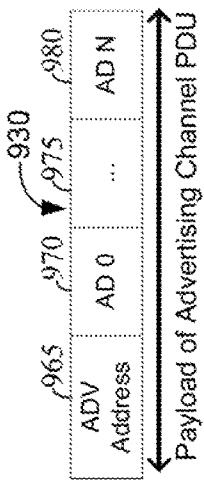
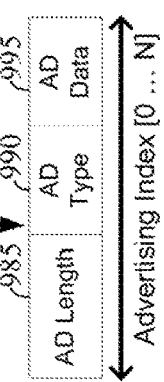
FIG. 9A
FIG. 9B
FIG. 9C
FIG. 9D
FIG. 9E

OUT OF BAND DIAGNOSTICS AND MAINTENANCE

CROSS-REFERENCE TO RELATED APPLICATION

This application is a continuation of U.S. patent application Ser. No. 15/215,846, filed on Jul. 21, 2016, the entire disclosure of which is incorporated herein by reference.

BACKGROUND

Conventional wall switches control light fixtures or electrical outlets for lamps over wired systems. The simplest wall switches are connected to a building's electrical power via electrical wiring and operate to connect or disconnect the electrical power to the conventional luminaire by switching electrical power ON or OFF. More sophisticated systems utilize wired data connected to enable wall switches and/or sensors to communicate with and control luminaires. More sophisticated systems, however, utilize luminaires and/or associated control devices that include intelligence (e.g. a processor, memory and programming) and appropriate communication interfaces. More recently, lighting systems have utilized wireless communications between the intelligent luminaires and the control-related elements of the system. For example, a light fixture or a connected power supply may receive an ON/OFF command over-the-air in response to activation of a wall switch that communicates the ON/OFF command wirelessly directly or indirectly to the power supply device that applies electrical power to the light source in the fixture.

Traditional approaches to collecting diagnostic information and performing maintenance of such lighting systems have involved inserting an additional device or element into the system. In a wireless system, such insertion involves positioning the additional device such that the additional device is able to capture or otherwise obtain wireless data. Addition of such device or element for diagnostic or maintenance purposes may negatively impact performance of the lighting system or otherwise influence collected information.

Accordingly, a system is needed to overcome these and other limitations in the art. Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

SUMMARY

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 9A is a wireless advertising packet format for out of band communications with a lighting system element via a wireless out of band channel.

FIG. 9B is an exploded view of an advertising channel protocol data unit of the advertising packet of FIG. 9A.

FIG. 9C is an exploded view of a header of the advertising channel protocol data unit of FIG. 9B.

FIG. 9D is an exploded view of a payload of the advertising channel protocol data unit of FIG. 9B.

FIG. 9E is an exploded view of an advertising index of the payload of FIG. 9D

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1A:
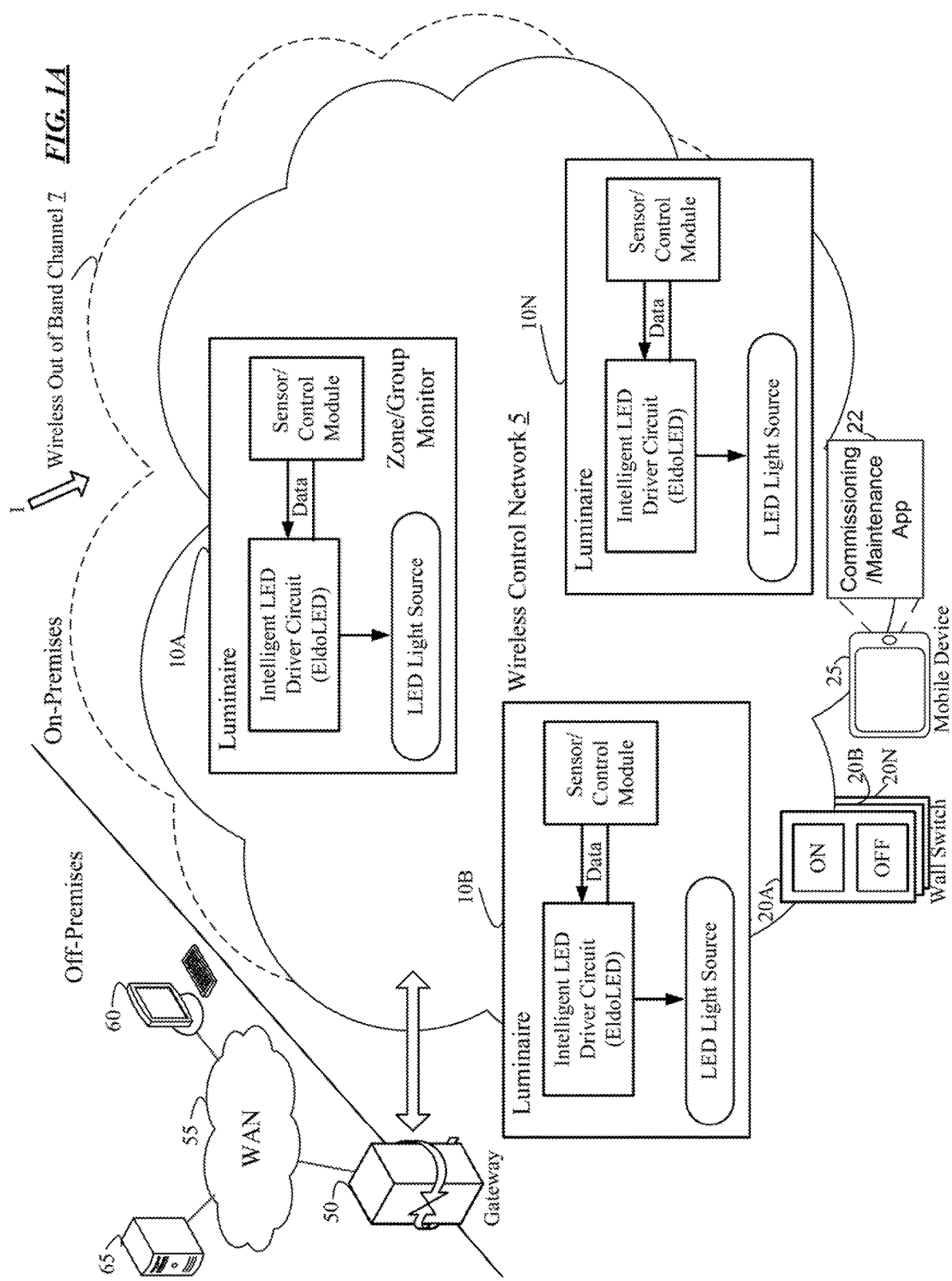
FIG. 1A is a high-level functional block diagram of an example of a system of networks and devices that support light commissioning/diagnostics/maintenance and provide a variety of lighting control, including communications in support of turning lights on/off, dimming, set scene, and sensor trip events.
Figure 1B:
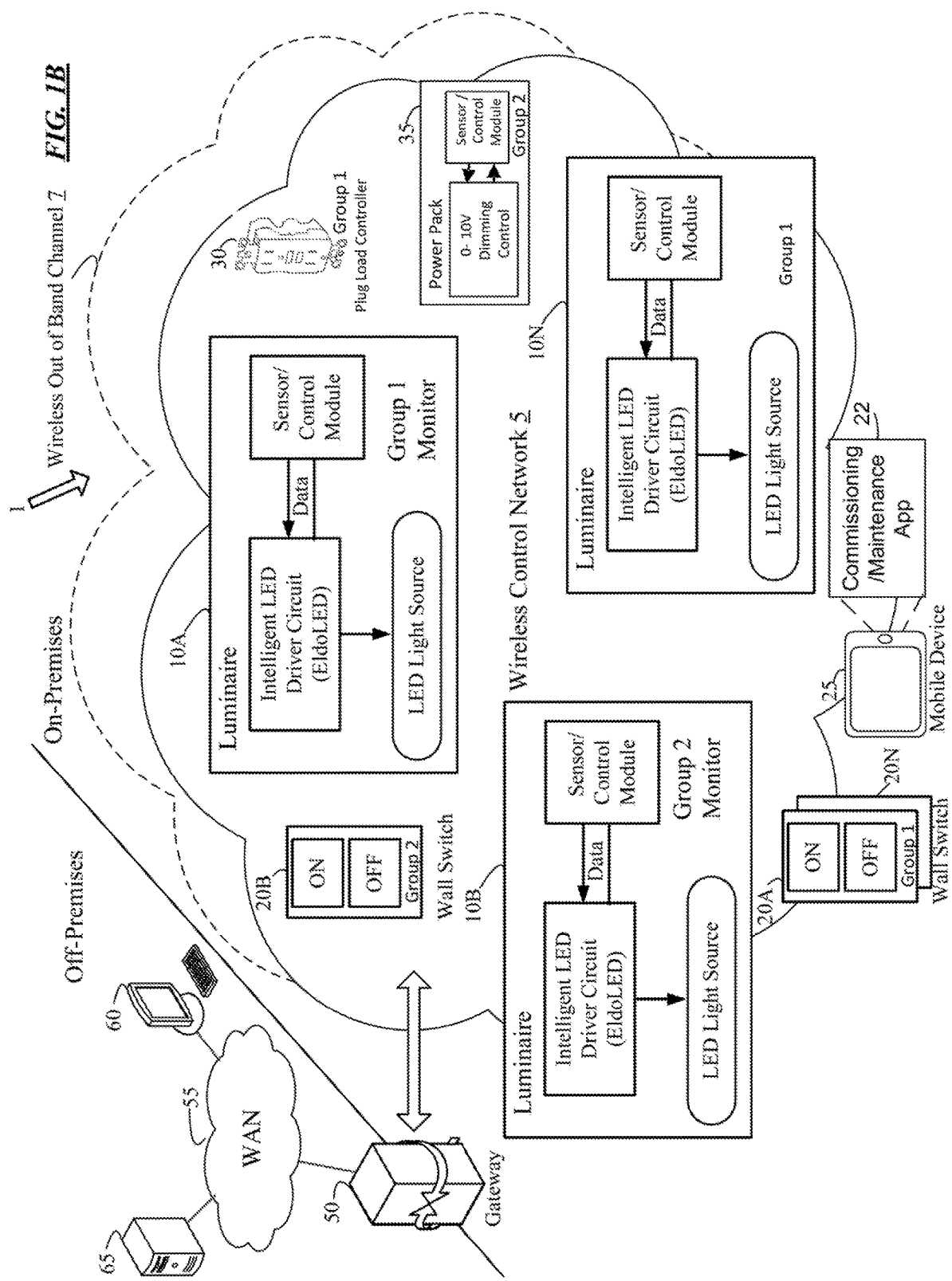
FIG. 1B is another high-level functional block diagram of an example of a system of networks and devices that further includes plug load controller and power pack devices and various lighting control groups.

FIGS. 1A-B both illustrate functional block diagrams of examples of a system of networks and devices that support light commissioning/diagnostics/maintenance and provide a variety of lighting control, including communications in support of turning lights on/off, dimming, set scene, and sensor trip events. FIG. 1B is the same as FIG. 1A, except 1B further includes additional lighting control devices (LCDs): a plug load controller 30 and a power pack 35; and illustrates exemplary lighting control groups.

The lighting control system 1 may be designed for indoor commercial spaces. Alternatively, lighting control system 1 may be designed for usage in an outdoor space. As shown, system 1 includes a variety of lighting system elements, such as a set of luminaires 10A-N (lighting fixtures) and a set of wall switches 20A-N. Daylight, occupancy, and audio sensors are embedded in lighting system elements, in this case luminaires 10A-N to enable controls for occupancy and dimming.

Luminaires 10A-N, wall switches 20A-N, plug load controller 30, and power pack 35 communicate control over a 900 MHz (sub-GHz) wireless control network 5 and accordingly each include a first radio in the sub-GHz range. A variety of controls are transmitted over wireless control network 5, including, for example, turn lights on/off, dim up/down, set scene (e.g., a predetermined light setting), and sensor trip events. Each luminaire 10A-N, wall switch 20A-N, plug load controller 30, and power pack 35, is also equipped with a second near range Bluetooth Low Energy (BLE) radio that communicates over wireless out of band channel 7 for purposes of commissioning, diagnostics and maintenance of the wireless lighting control system 1, however no controls pass over this wireless out of band channel 7.

Plug load controller 30 plugs into existing AC wall outlets, for example, and allows existing wired lighting devices, such as table lamps or floor lamps that plug into a wall outlet, to operate in the lighting control system 1. The plug load controller 30 instantiates the table lamp or floor lamp by allowing for commissioning, diagnostics and maintenance operations and processes wireless lighting controls in order to allow the lighting device to operate in the lighting control system 1.

Power pack 35 retrofits with existing wired light fixtures (luminaires). The power pack 35 instantiates the wired light fixture by allowing for commissioning, diagnostics and maintenance operations and processes wireless lighting controls in order to allow the lighting device to operate in the lighting control system 1.

Both plug load controller 30 and power pack 35 can include the same circuitry, hardware, and software as light fixtures 10A-N and wall switches 20A-N.

The system 1 is provisioned with a mobile device 25 that includes a commissioning/maintenance application 22 for commissioning, diagnostics and maintenance functions of the lighting control system 1. For example, mobile device 25 enables mobile commissioning, configuration, and maintenance functions and can be a PDA or smartphone type of device with human interfacing mechanisms sufficient to perform clear and uncluttered user directed operations. Mobile device 25 runs mobile type applications on iOS7, Android KitKat, and windows 10 operating systems and commissioning/maintenance application 22 to support commissioning.

Web enabled (cloud) services for facilitating commissioning, diagnostics and maintenance activities is also provided by mobile device 25. The commissioning/maintenance application 22 of mobile commissioning device 25 interfaces with the cloud services to acquire installation and configuration information for upload to luminaires 10A-N, wall switches 20A-N, plug load controller 30, and power pack 35. The installation and configuration information is received by mobile device 25 from the gateway 55. The gateway 50 engages in communication through the wide area network (WAN) 55.

A gateway 50 and backhaul connection capability may also be provided.

Lighting control system 1 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting control system 1 includes a communications backbone and includes model—transport, network, media access control (MAC)/physical layer (PHY) functions. The sub-GHz communications of the wireless control network 5 features are built on a near 802.15.4 MAC and PHY implantation with network and transport features architected for special purpose control and air time optimizations to limit chatter.

The lighting control system 1 can be deployed in standalone or integrated environments. System 1 can be an integrated deployment, or a deployment of standalone groups with no gateway 50. One or more groups of lighting control system 1 may operate independently of one another with no backhaul connections to other networks.

Lighting control system 1 may comprise a mix and match of various indoor systems, wired lighting systems (nLight® wired), emergency, and outdoor (dark to light) products that are networked together to form a collaborative and unified lighting solution. Additional control devices and lighting fixtures, gateway(s) 50 for backhaul connection, time sync control, data collection and management capabilities, and interoperation with the Acuity Brands Lighting's commercially available SensorView product may also be provided.

As shown in FIG. 1B, control, configuration, and maintenance operations of the lighting control system 1 involve networked collaboration between the luminaires 10A-N, wall switches 20A-N, plug load controller(s) 30, and power pack(s) 35 that comprise a lighting control group. An installation is comprised of one or more lighting control groups each operating independently of one another. One or more lighting control groups may exist in the wireless control network 5. Each lighting control group will have a group monitor, and this is shown in FIG. 1B where there a two groups and each group has a monitor.

Groups are formed during commissioning of the lighting control system 1 where all members of the group are connected together over wireless control network 5, which in our example is a sub-GHz subnetwork defined by an RF channel and a lighting control group identifier.

The lighting system elements subscribe to channels and only listen for/react to messages on the RF channel with the identifier (ID) of the subscribed channel that designates the lighting control group that the lighting system element is a member of.

In general, groups do not share RF channels and thus form their own RF subnetwork, however with only 10 available channels some overlap is inevitable. Analysis and simulation have indicated that group distribution and spatial separation will mitigate the congestion and collision side effects that can occur when many lighting system elements 10A-N, 20A-N, 30, 35 share a singular RF enclave.

A group can be further divided to address control to specific control zones within the group defined by a control zone identifier. Zone communications are managed as addressable features at run time. Up to 16 independent zones of control are available for each group and each group can support up to 128 addressable elements (luminaires 10A-N, wall switches 20A-N, plug load controller 30, power pack 35).

The wireless control network 5 distributes control messages and events, network management messages and events, health and failover events, and group commissioning, diagnostics and maintenance communications, such as firmware update distributions and group membership changes.

Wireless control network 5 provides a secure control network (Sub-GHz) on which to operate. Devices are manually added to the wireless control network 5 via the commissioning process via commissioning/maintenance application 22 of mobile device 25. The commissioning process includes authorization and authentication features that allow only trusted and known entities to add confirmed devices 10A-N, 20A-N, 30, 35 to the network. Requirements relating to network modification (device add/delete/modify) are allocated to the mobile device 25 and its interface (commissioning/maintenance application 22) to the lighting control system 1.

Message authentication in the lighting control system 1 is provided by the 802.15.4 compliant MAC layer solution commercially available from Silicon Labs. The solution uses the AES CCM block cypher mode of operation to secure over the air frames. The mode of operation provides NIST compliant authentication, encryption, and integrity assurance to defeat replay attacks as well as device and message spoofing.

Lighting control system 1 also implements an additional layer of authentication by performing checks on the message source and addressing mechanisms to reject messages from unknown sources (i.e. sources that are not authorized members of a lighting control group network). An intrusion detection scheme using the above schemes and that reports such events will be made via the gateway 50.

The sub-GHz MAC/PHY (wireless control network 5) thus provides secure communication features (authentication, data integrity, and encryption assurance) based on the 802.15.4 standard.

The lighting system elements over the wireless control network 5 together may engage in any-to-many communication and can implement a non-mesh wireless network topology. In our example, wireless control network 5 is a star topology network. Although other network schemes may be utilized, a star topology may be the best fit for aligning the required control communications features with the characteristics of sub-GHz wireless radio. At the center of each lighting control group in a star topology wireless control network 5 is a singular group monitor as shown in FIG. 1B. In FIG. 1B, luminaire 10A is the group monitor for lighting control group 1 and luminaire 10B is the group monitor for lighting control group 2. Lighting control group 1 further comprises luminaire 10N, wall switch 20A, and plug load controller 30. Lighting control group 2 further comprises wall switch 20B and power pack 35.

The monitor is responsible for receiving control events from their source (luminaires 10A-N, wall switches 20A-N, plug load controller 30, and power pack 35) and ensuring reliable and timely delivery of the event to the other members of the group. The monitor uses a quick best effort multicast mechanism for fast high-probability delivery. The monitor follows up the multicast with a reliable point to point communication to ensure that all destination devices received and acknowledge the event.

Commissioning

Commissioning is the process that sets the lighting control configuration and settings that drive the behavior of the lighting control system 1 and the various elements of that system. One or more mobile devices 25 can be used to commission the installation of lighting control system 1. During setup, commissioning/maintenance application 22 of the mobile device 25 provides a secure method for a system installer to configure the lighting system elements for installation commissioning. The lighting system elements include luminaires 10A-N, wall switches 20A-N, plug load controller 30, and power pack 35.

General behavioral settings and network addressing information are stored on the mobile device 25 for upload and allocation to the installation's lighting system elements via commissioning/maintenance application 22. The installation information is managed by commissioning/maintenance application 22 of mobile device 25 to ensure correctness and to eliminate common errors such as assignment of duplicate network addresses. Communication between the mobile device 25 for commissioning/maintenance and the lighting system elements is over the wireless out of band channel 7, such as a BLE network. The lighting system elements are initially in an installation state, beaconing their advertisements when the commissioning starts.

Upon connection with the mobile device 25, the commissioning/maintenance application 22 of mobile device 25 transitions the lighting system elements to a commissioning state. Further upon connection, the lighting system element authenticates the mobile device 25 and is ready to accept commands over the wireless out of band channel 7. The wall switches 20A-N suppress sleep mode until completion of the commissioning process and transition to operational mode. Wall switches 20A-N will re-enter sleep mode if the commissioning process is interrupted—two elapsed hours with no activity.

An installation is commissioned according to lighting control groups. A group is a collection of LCDs sharing the same space within an installation (e.g. a room or area). Each lighting control group in the installation has a special lighting system element called the group monitor. The group monitor keeps tabs on the overall state and health of the lighting system elements within the group and assists in the communication of lighting control events between group elements. In general, one can visualize the group network topology as a star with the group monitor as the central node and the remainder of the group's lighting system elements at points of the star.

A group is commissioned by first establishing the group's lighting control network 5 and then configuring the group's control behavior. The lighting control network 5 is established over a 802.15.4 based MAC riding on top of a sub-GHz (904 MHz to 926 MHz) PHY. The wireless out of band channel 7, such as a Bluetooth Low Energy MAC/PHY, is used as the point to point connection medium to transfer control network configuration from the commissioning/maintenance application 22 of the mobile device 25 to a lighting system element The commissioning/maintenance application 22 of mobile device 25 builds a network table of the group devices while establishing the lighting control network 5. The network table, used by the group monitor in the execution of its responsibilities, is uploaded from the mobile device 25 to the group's lighting system elements via commissioning/maintenance application 22.

Each lighting system element also has a behavioral configuration. The configuration is specified by a group of settings that define control characteristics such as sensor set points, delays, modes, and ranges. The control characteristics also specify independent zones of control within the group. These characteristics and settings are customized as necessary and uploaded from the mobile device 25 to each lighting system element via commissioning/maintenance application 22.

During the commissioning process, line powered lighting system elements are installed, powered, and advertising over BLE. Battery powered lighting system elements, such as wall switches 20A-N, are installed and in sleep mode to conserve power. After the mobile device 25 is setup, an installer opens the commissioning/maintenance application 22 on the mobile device 25 and walks into an area of the installation that is ready to commission as a lighting control group.

Configuring a Group Network

Wall switches 20A-N and luminaires 10A-N are under the command of the mobile device 25 and respond to a sequence of commands to configure a group network. The wall switches 20A-N respond to a blink request by rapidly blinking an LED. The LED pilot light brightness level is set to a maximum. The luminaires 10A-N responds to a blink request by rapidly blinking an LED light pack. At any time, the lighting system element, including luminaires 10A-N, wall switches 20A-N, plug load controller 30, plug pack 35, etc., ceases blinking upon command. The device then accepts the sub-GHz short MAC address, group number, group name, group RF channel, and personal area network (PAN) ID from the mobile device 25. The device persists this information in non-volatile memory (NVM). The device ceases blinking.

The lighting system element accepts the settings from the commissioning/maintenance application 22 of mobile device 25 and persists the settings in non-volatile memory. Additionally, lighting system elements that are luminaires 10A-N also receive settings for an on-board controller (MCU) and on-board integrated sensors. The lighting system element may also receive a request to execute an RF spectrum scan to determine the group RF channel. If so, the lighting system element executes the scan and returns the results to the mobile device 25 for distribution to the other group devices.

The above sequence of commands issued from the commissioning/maintenance application 22 of mobile device 25 are expected to be in order. Commands received out of order are consider to be an intrusion attempt. The lighting system element configures its media access control (MAC) layer device circuitry and its physical layer circuitry for the OSI model (PHY) with the data transferred from the mobile device 25 and remains in commissioning state.

Connecting a Group Network

To connect to the group network, the lighting system elements accept the group address table from the mobile device 25. The group address table identifies all of the lighting system elements in the group. The device persists this information in non-volatile memory. The device uses the lighting control network 5 (e.g., sub-GHz network) to pass the group address table to the other lighting system elements, such as luminaires 10A-N and wall switches 20A-N, in the group. The communication over the lighting control network 5 is reliable-unicast and may involve some message segmenting if the table size exceeds transport protocol data unit (PDU) size.

The lighting system element returns a status to the mobile device 25 indicating success or failures encountered while distributing the table. The lighting system element accepts a command to tune the group RF transmission (TX) power levels and executes the tune according to the discussion below.

The commissioning/maintenance application 22 of mobile device 25 disconnects after issuing the command to tune the group RF TX power levels. The above sequence of commands issued from the mobile device 25 are expected to be in order. As noted previously, commands received out of order are consider to be an intrusion attempt. Upon completion, the lighting system elements in the group transition to an operational state.

Radio Frequency Channel Selection

The group RF channel is determined at commissioning time by a line powered lighting fixture, such as luminaires 10A-N. The commissioning/maintenance application 22 of mobile device 25 requests the A spectrum scan of the available channels (10) seeking the channel with the lowest average noise level measured over a short period of time.

The process is as follows. Mobile device 25 is connected to a luminaire 10A-N via the commission network 7 (e.g., BLE). The mobile device 25 requests a spectrum scan indicating the number of samples/per channel to be produced. The luminaire 10A-N executes a passive scan of the following channels (channel number, center frequency):

1 904 MHz
2 906 MHz
3 908 MHz
4 910 MHz
5 912 MHz
6 914 MHz
7 916 MHz
8 918 MHz
9 920 MHz
10 922 MHz
11 924 MHz
12 926 MHz

The luminaire 10A-N returns the average energy and peak energy detected for each channel. The commissioning/maintenance application 22 of mobile device 25 determines the optimum RF channel from the average and peak energy samples giving preference (via a weighting factor) to channels 5-8. The commissioning/maintenance application 22 of mobile device 25 commands the lighting system element to configure its MAC/PHY to use the optimum RF channel.

A modified method that replaces the above method with one that uses a discovery and link quality measurement to join the optimum gateway subnetwork may also be used. Whatever the method (gateway 50 or non-gateway), the RF channel selection scheme is timely to meet the user experience requirements for commissioning. Alternatively, this procedure may be decoupled from mobile device 25 so that channel selection can also execute independently by lighting system elements, such as luminaires 10A-N and wall switches 20A-N.

Transmission Power Adjustment

Sub-GHz RF TX power levels may be managed to optimize intra-group communications in a way that limits adverse effects (collisions, retries, corrupt packets, etc.) on adjacent group subnetworks that happen to be sharing the RF channel. The group monitor executes a link test with each lighting system element in the group as follows. The group monitor sends a link test message to the lighting system element. The device returns a link test response to the group monitor indicating the received strength signal indicator (RSSI-1) of the received message in 1. The group monitor receives the response and notes the RSSI of the received message (RSSI-2). If RSSI-1 is less than the minimum RSSI-1s recorded so far, it records the new minimum RSSI.

The group monitor returns a link test response acknowledgment to the device indicating RSSI-2. The device receives the acknowledgement. The device adjusts it RF TX power appropriately if the RSSI-2 does not fall within the desired range. The device returns a link test status (continue) to the group monitor. The device returns a link test status (complete) if the RSSI-2 is within the desired range. The group monitor receives the link test status. The process repeats if the status indicates continue (is within the desired range). Steps 1 through 6 are repeated until all devices in the group have been tested. The transmission (TX) power adjustment can also be invoked for a single group monitor—device link. In this case, all devices in the group do not need to be tested.

Lighting System Element Health

The group monitor periodically checks the health of each lighting system element, such as luminaires 10A-N, wall switches 20A-N, plug load controller 30, and power pack 35, in the group. The group monitor runs a round robin check of each group device such that every device receives a request to report health once every hour. In an example, given a group with a maximum number of devices (128), the group monitor will issue a request for health status every ~28.125 seconds while a group of six will result in a health request every 10 minutes.

Clock drift and frequency of over the air messaging are not expected to cause undesirable side effects or performance hits to the network 5, however health requests are delayed via a back off timer of 10 seconds during bursts of network traffic to allow potential congestions to clear and make way for higher priority control operations.

The group monitor records faults reported by lighting system elements for later retrieval by commissioning/maintenance application 22 of mobile device 25 for commissioning, diagnostics and maintenance. Such recorded faults may be provided as part of statistics in a response to a diagnostic query from mobile device 25.

Communication Failures

Wireless messaging failures are possible and expected, however continuous failures indicate a problem that might be rectified by adjusting the RF properties of the communications link of lighting system elements, such as luminaires 10A-N and wall switches 20A-N. Continuous failures may result if there is a change to the environment that alters RF performance or in cases where a lighting system element is experiencing internal failures.

Attempts to resolve communications failures are managed by the group monitor rather than separately at each lighting system element. Reliable-unicast messaging acknowledgement is the driver for detecting communications failures.

At lighting system elements, a communication failure occurs when the device transmits a reliable-unicast message and fails to receive an acknowledgement within a retry period. Upon detecting such a failure, the lighting system element increments its counters of total failures and attempts. The lighting system element reports the percentage of failures in response to a request for health status from the group monitor. The lighting system element resets its counters after successful report of health status.

At a group monitor, the group monitor associates a four bit counter with each lighting system element in the group for purposes of tracking communication failures. A failure occurs when the group monitor receives no acknowledgement back after transmitting a reliable-unicast message to a group device. The group monitor will increment the counter for that lighting system element whenever a failure occurs. The counter is reset whenever a successful transmission occurs. Such counter may be provided as part of statistics in a response to a diagnostic query from mobile device 25.

If the counter reaches a value of 0x7 for any lighting system element, the group monitor attempts to correct the consistent communication failure by issuing a command to the lighting system element to incrementally increase its RF TX power level.

If the counter reaches a value of 0xE for any lighting system element, the group monitor initiates an RF TX Power adjustment for the link. Counters that reach a max of 0xF remain there and may indicate a dead lighting system element. Power level adjustment trigger may be changed to act on percentage of failures (similar to the device health method below) rather than consecutive failure conditions.

The group monitor 10A issues a command to the lighting system element to incrementally increase its RF TX power level if the device's status indicates transmission failures at or greater than 15%. The group monitor initiates an RF TX Power adjustment for any communications link where the lighting system element's status indicates transmission failures at or greater than 25%.

Figure 2A:
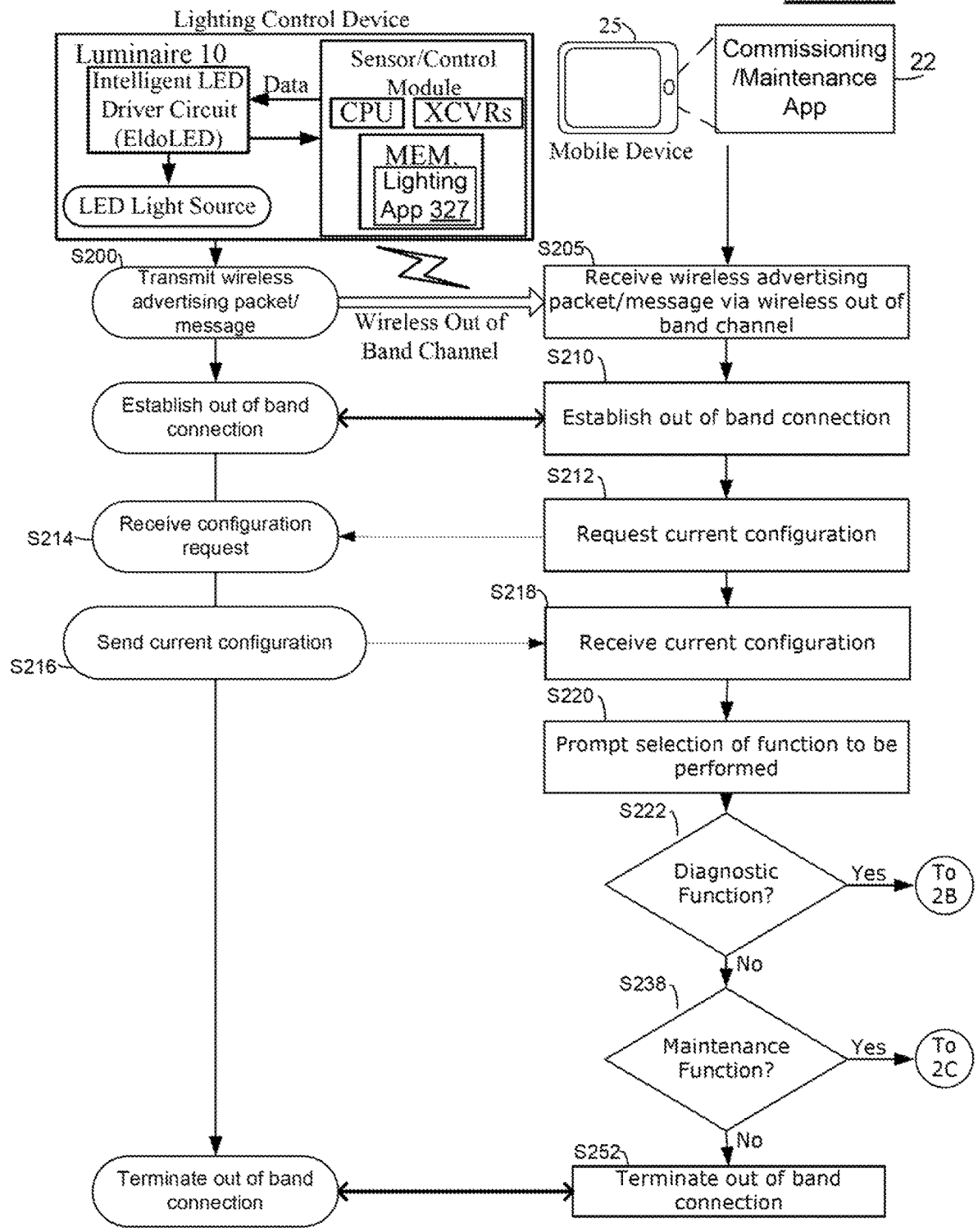
FIG. 2A is a high-level flow chart of an example of a diagnostics and maintenance protocol procedure for the lighting control system of FIG. 1A or FIG. 1B.
Figure 2B:
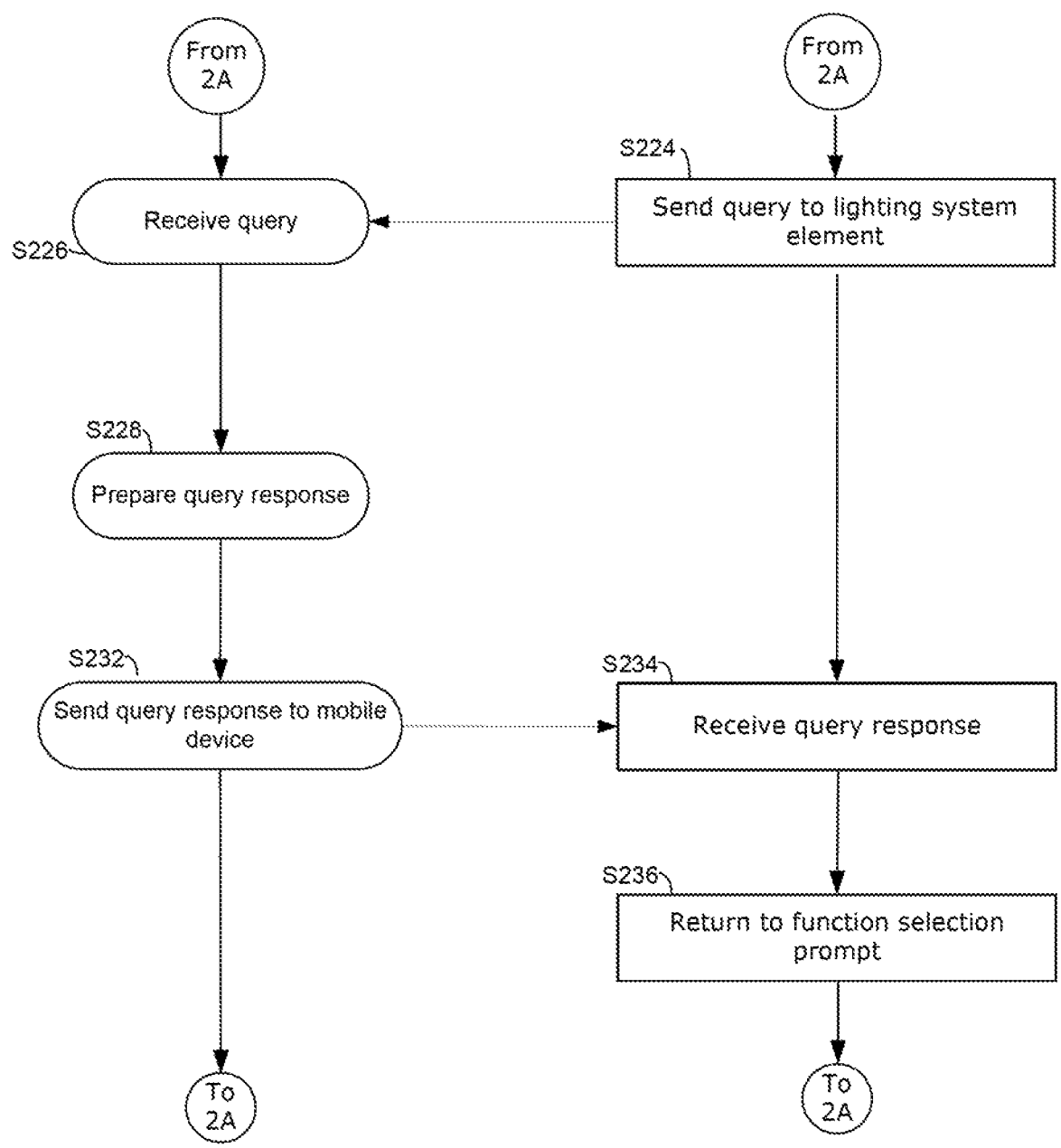
FIG. 2B is a high-level flow chart of an example of one portion of the diagnostics and maintenance protocol procedure for the lighting control system of FIG. 1A or 1B.
Figure 2C:
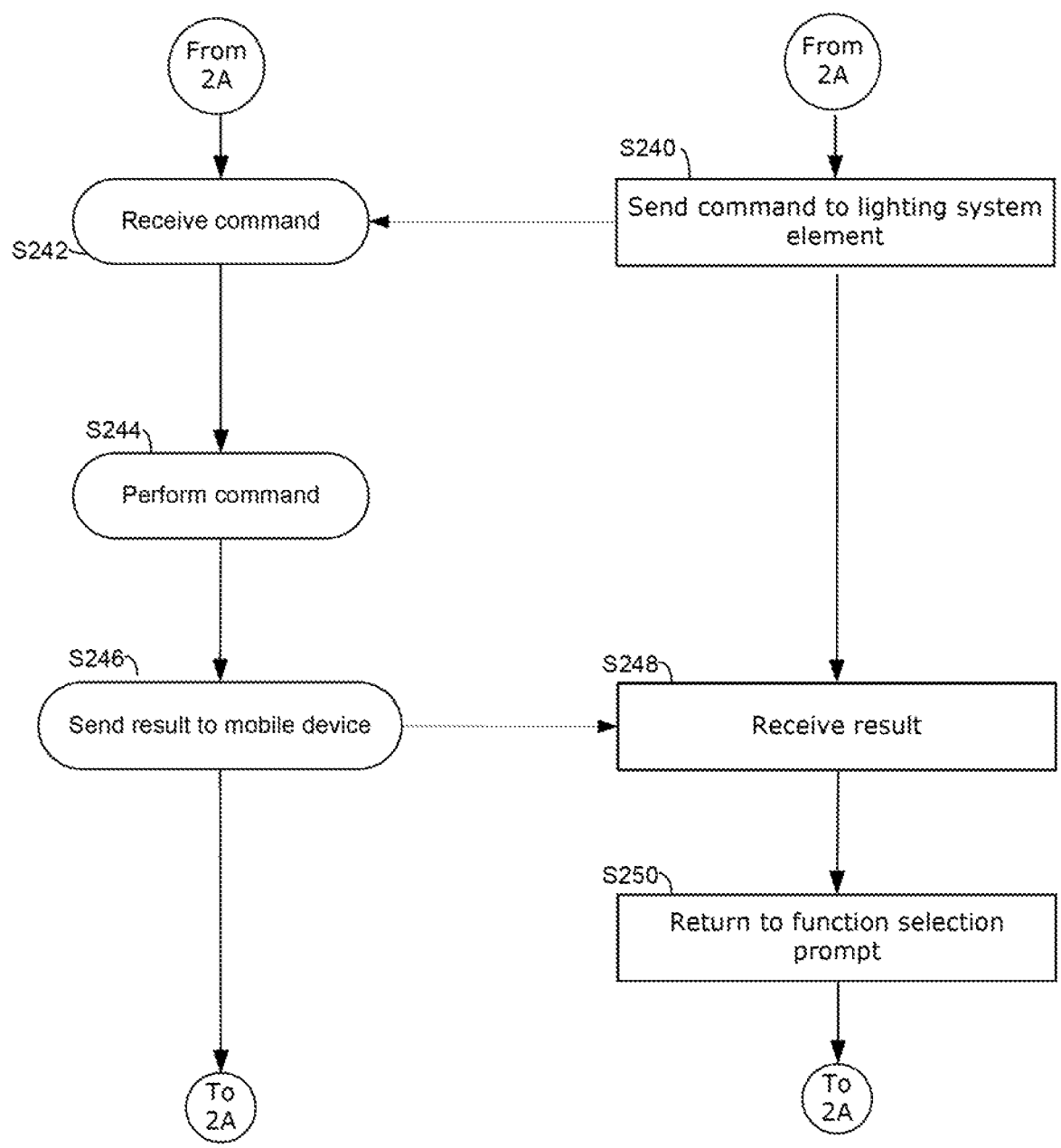
FIG. 2C is a high-level flow chart of an example of another portion of the diagnostics and maintenance protocol procedure for the lighting control system of FIG. 1A or 1B.

FIGS. 2A-C depict a diagnostics and maintenance protocol procedure for any of the lighting control systems of FIGS. 1A-B. FIG. 2A depicts the common portion of the procedure while FIG. 2B depicts a portion of the procedure related to a diagnostic function and FIG. 2C depicts a portion of the procedure related to a maintenance function. As shown in FIG. 2A, various lighting system elements (luminaires 10A-N, wall switches 20A-N, plug load controller 30, and power pack 35) go through a series of states and transitions, and engage in communications with mobile device 25 during maintenance of the lighting control system. Although luminaire 10 is shown in this example, it should be understood that the diagnostics and maintenance protocol procedure shown applies to all of the other lighting system elements, such as a wall switches 20A-N, plug load controller 30, and power pack 35.

A precondition to the protocol procedure may be the following. Line powered lighting system elements (e.g., luminaires 10A-N) are installed, powered, and advertising over the wireless out of band channel. The wireless out of band channel is a 2 gigahertz or higher radio band in our example. Battery powered lighting system elements (e.g., wall switches 20A-N) are installed and in sleep mode to conserve power. An installer, maintainer or other user of the lighting control system sets up the mobile device 25, opens the commissioning/maintenance application 22 on the mobile device 25, and walks into an area of the installation to perform diagnostics and/or maintenance of one or more lighting system elements of the lighting control system.

Beginning in block S200, programming in a memory of the luminaire 10, specifically lighting application 327, configures a processor of the luminaire 10 to transmit/send an advertisement packet via the wireless out of band communication channel to a mobile device. The advertising packet transmitted via the wireless out of band channel includes a preamble, an access address, a protocol data unit (PDU), and a cyclic redundancy check (CRC). The packet data unit (PDU) includes a header and a payload, and the payload includes an advertising address.

When the lighting system element is a battery powered lighting system element, such as a battery powered wall switch device or standalone sensor, the installer of the lighting control system may push a button on the device. In response to pushing of a button on the battery powered device, the wall switch or the like wakes up from a sleep mode and then transmits the advertisement packet via the wireless out of band channel to the mobile device 25. After a predetermined time period, the battery powered device ceases to transmit advertising packets. After ceasing to transmit advertising packets, the battery powered device enters back into a sleep mode.

Moving to block S205, the mobile device 25 receives, from each of a plurality of lighting system elements, an advertisement packet via the wireless out of band channel, including, for example, the advertising packet previously transmitted by luminaire 10. For example, the installer, maintainer or other user of the lighting control system selects the lighting system element (e.g., wall switch or luminaire 10) that has sent an advertising packet and requests a curtsy (2 on/off light toggle events).

Hence, in block S210, the mobile device 25 establishes an out of band connection with each of the lighting system elements via the wireless out of band channel. Connection encryption is managed by the wireless out of band channel link layer (e.g., Bluetooth). The luminaire 10, for example, authenticates the mobile device 25 and closes the connection if authentication fails.

Once the out of band connection is established, mobile device 25, in block S212, requests a current configuration from luminaire 10. Upon receipt, in block S214, of the configuration request, luminaire 10, in block S216, sends the current configuration to mobile device 25. The current configuration includes, for example, a short media access control (MAC) address, a lighting control group identifier, a radio frequency (RF) channel, a personal area network (PAN) identifier and a transmission (Tx) power level. In block S218, mobile device 25 receives the current configuration from luminaire 10. The installer, maintainer or other user of the lighting control system may review the current configuration as part of any diagnostic and/or maintenance function to be performed. For example, based on the current configuration, the install, maintainer or other user may determine that further diagnostic information is needed from the system element or that the system element should be updated, restarted or reset as part of a maintenance function.

In block S220, the installer, maintainer or other user is prompted to select a function to be performed. Such selection includes, for example, a diagnostic function and a maintenance function, although such selection need not be limited to those two functions. The diagnostic function, as described in greater detail below related to FIG. 2B, enables the installer, maintainer or other user to retrieve statistics and/or other information related to performance of luminaire 10, other lighting system elements and/or the lighting control network. The maintenance function, as described in greater detail below related to FIG. 2C, enables the installer, maintainer or other user to issue a command to luminaire 10 and receive a result of the command from luminaire 10.

In block S222, mobile device 25 determines whether a diagnostic function has been selected. If no, mobile device 25, in block S238, determines whether a maintenance function has been selected. If no, the procedure moves to block S252.

In block S252, the out of band connection between the lighting system element and the mobile device 25 is terminated. Either mobile device 25 or the lighting system element, such as luminaire 10, may issue a command to terminate the out of band connection.

The lighting system element then updates its wireless out of band channel scan response information and returns to wireless out of band channel (e.g., Bluetooth) advertising mode. The lighting system element also powers up and configures its lighting control network transceiver (e.g., sub-GHz MAC/PHY). The installer, maintainer or other user repeats the process of FIGS. 2A-C via the commissioning/maintenance application 22 of mobile device 25 for each lighting system element the installer, maintainer or other user needs to access.

Subsequently (e.g., as a post-condition), the lighting system elements of the lighting control group are capable of receiving communication over the lighting control network (e.g., the sub-GHz network). Battery powered lighting system elements, such as a wall switch, may automatically terminate/disconnect the out of band connection with the mobile device 25 after a predetermined time period. Such battery powered lighting system elements return to sleep mode after disconnecting/terminating the out of band connection and receiving the lighting control group network table.

After termination of the out of band connection between the lighting system element and the mobile device 25 via the wireless out of band communication channel, the lighting system element may continue to transmit advertisement packets via the wireless out of band channel to the mobile device 25. For example, line powered lighting system elements return to advertising over the wireless out of band channel (e.g., Bluetooth) and battery powered lighting system elements return to sleep mode to conserve power.

Returning to block S222, when a diagnostic function is selected, the procedure moves to block S224 of FIG. 2B. In block S224, mobile device 25 sends a query to luminaire 10. The query includes, for example, a request for diagnostic information. Such diagnostic information includes, for example, statistics related to performance of luminaire 10, statistics related to performance of the lighting control network, and/or statistics related to performance of another lighting system element within the lighting control group.

In block S226, luminaire 10 receives the query and, in block S228, prepares a query response. The query response includes, for example, various statistics and/or other diagnostic information based on the received query. In block S232, luminaire 10 sends the query response to mobile device 25. Mobile device 25, in block S234, receives the query response. As part of receipt, mobile device 25, for example, displays some or all of the information from the query response via the commissioning/maintenance application 22. Alternatively, or in addition, mobile device 25 may store some or all of the information from the query response for later reference and/or further processing. Once the query response is received, mobile device 25, in block S236, returns to the function selection prompt in block S220 of FIG. 2A.

Moving again to block S238, when a maintenance function is selected, the procedure moves to block S240 of FIG. 2C. The selected maintenance function includes, for example, one or more commands to be sent to luminaire 10. As part of maintenance of luminaire 10, for example, the installer, maintainer or other user may desire to restart, reset and/or update/upgrade some portion or all of a configuration or programming within luminaire 10. As such, in block S240, mobile device 25 sends one or more commands to luminaire 10. Luminaire 10, in block S242, receives the one or more commands and, in block S244, performs each command. Performance of a command also provides a result. The provided result includes, for example, an indication of whether the command was performed successfully or failed to perform. In block S246, luminaire 10 sends any result to mobile device 25. Mobile device, in block S248, receives the result. As part of receipt, mobile device 25, for example, displays some or all of the result via the commissioning/maintenance application 22. Alternatively, or in addition, mobile device 25 may store the result for later reference and/or further processing. Once the result is received, mobile device 25, in block S250, returns to the function selection prompt in block S220 of FIG. 2A.

Extensions to the above steps for battery powered elements (wall switches) are as follows. The installer, maintainer or other user walks over to a battery powered lighting system element in the installation and wakes up the device, for example, by pushing a button. As a result, the mobile device 25 receives an advertising packet from the battery powered lighting system element and establishes an out of band connection with the device. Any necessary diagnostic and/or maintenance functions are performed. The mobile device 25 disconnects from the battery powered lighting system element. The battery powered lighting system element turns off its wireless out of band channel radio and returns to sleep mode.

Figure 3A:
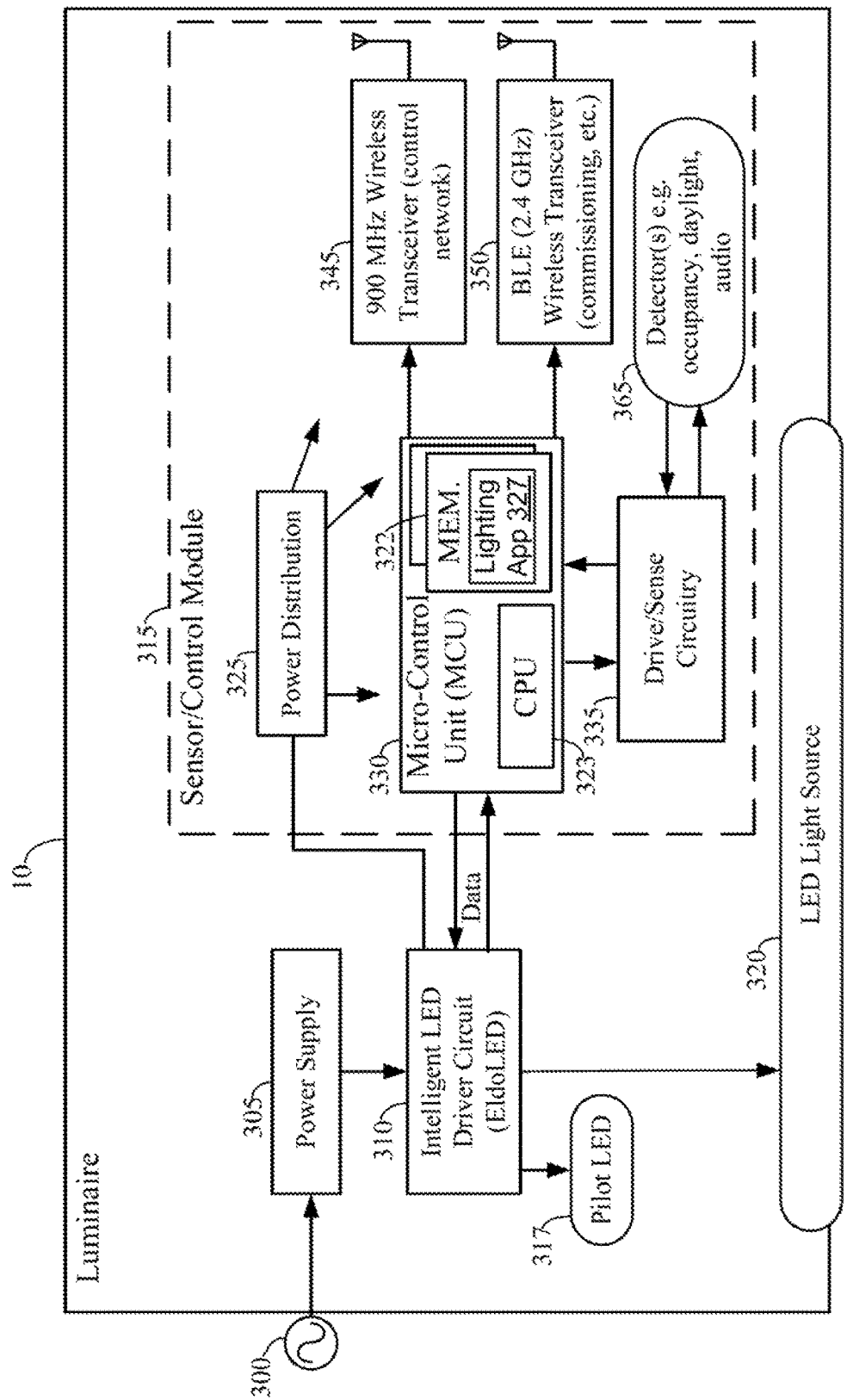
FIGS. 3A-C are block diagrams of examples of luminaires that communicate via the lighting control system of FIG. 1A or 1B.
Figure 3B:
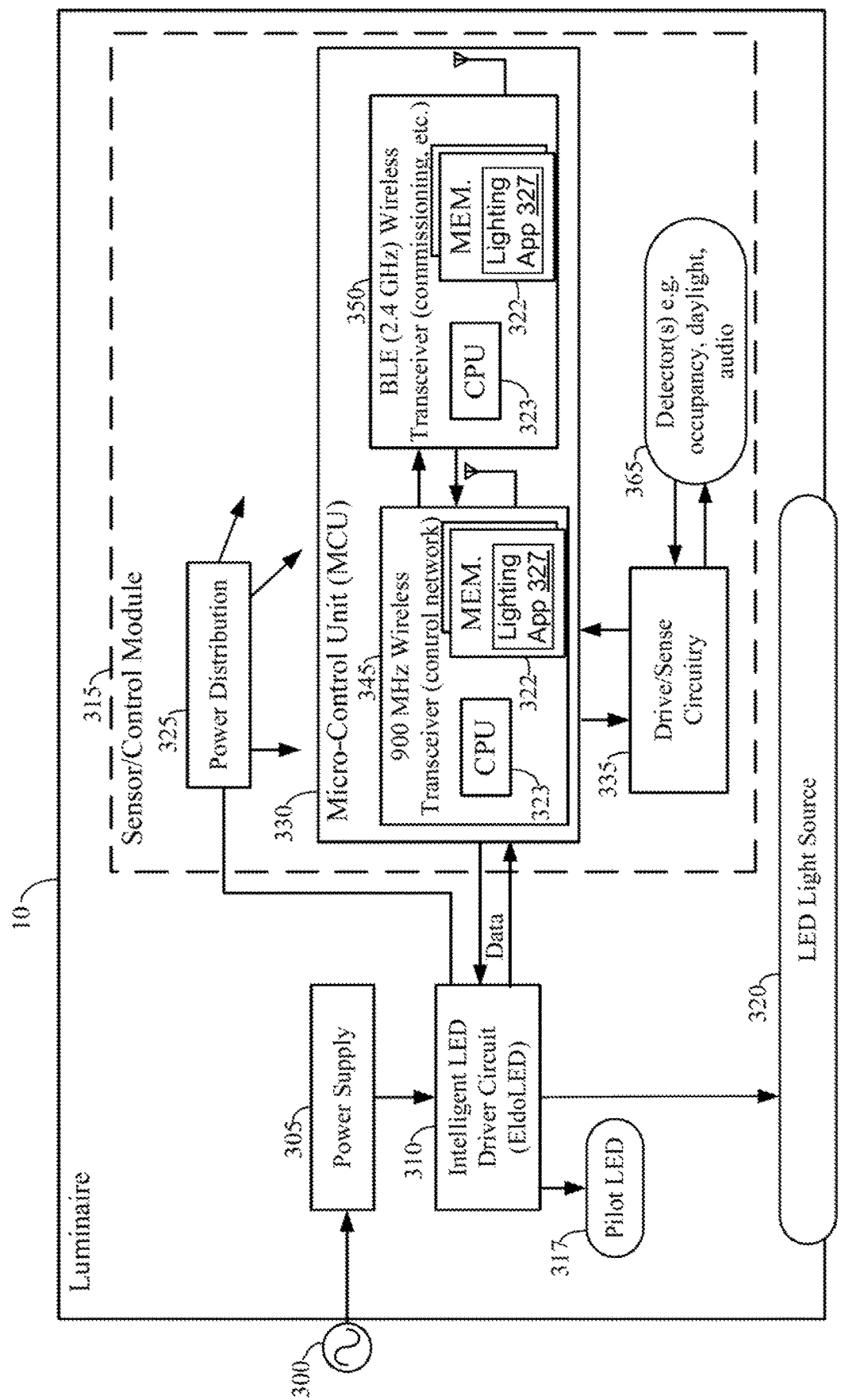
Figure 3C:
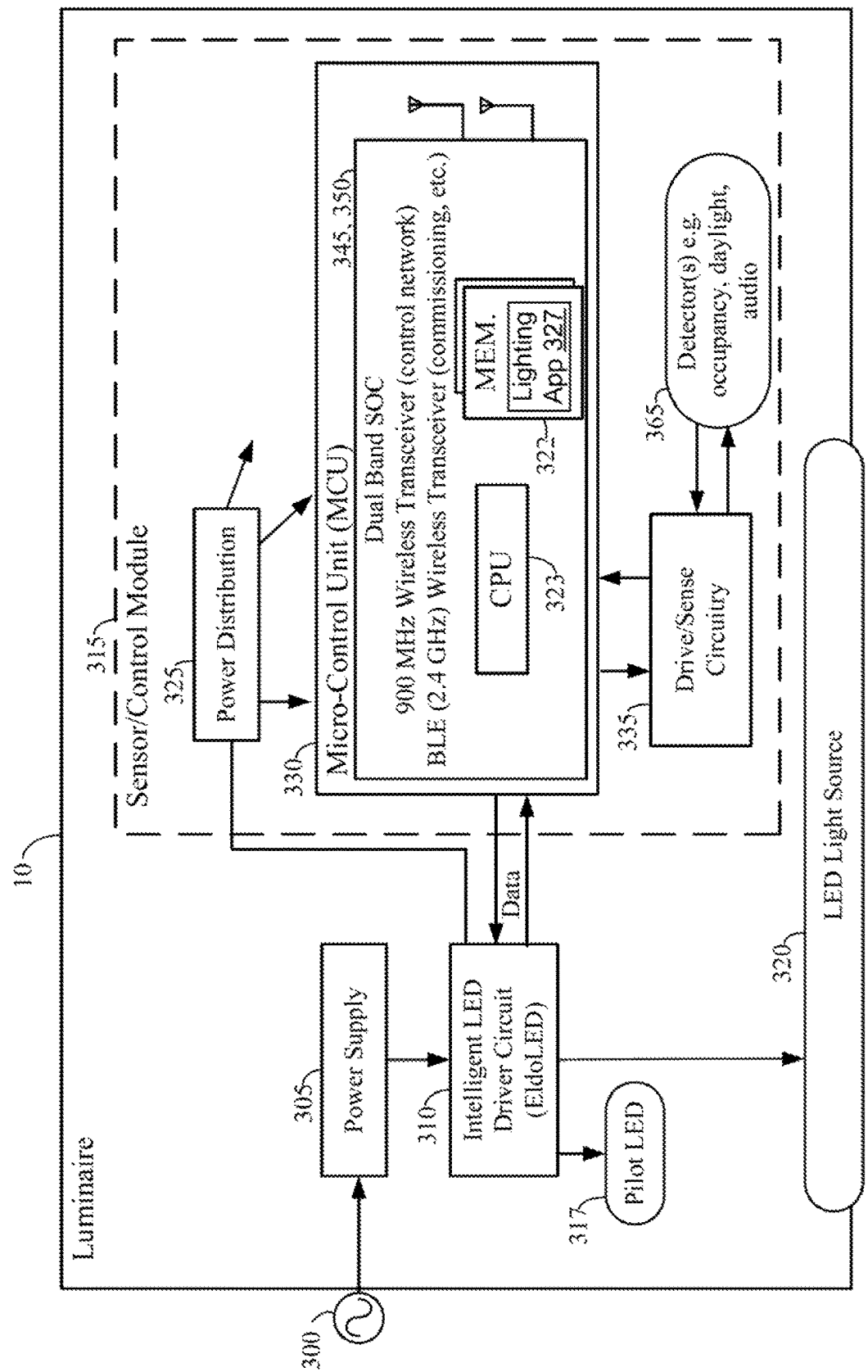

FIGS. 3A-C are block diagrams of a luminaire 10 that communicate via the lighting control system of FIGS. 1A-B. Luminaire 10 is an integrated light fixture that generally includes a power supply 305 driven by a power source 300. Power supply 305 receives power from the power source 300, such as an AC mains, battery, solar panel, or any other AC or DC source. Power supply 305 may include a magnetic transformer, electronic transformer, switching converter, rectifier, or any other similar type of circuit to convert an input power signal into a power signal suitable for luminaire 10.

Luminaire 10 furthers include an intelligent LED driver circuit 310, sensor/control module 315, and a light emitting diode (LED) light source 320. Intelligent LED driver circuit 310 is coupled to LED light source 320 and drives that LED light source 320 by regulating the power to LED light source 320 by providing a constant quantity or power to LED light source 320 as its electrical properties change with temperature, for example. The intelligent LED driver circuit 310 includes a driver circuit that provides power to LED light source 320 and a pilot LED 317. Intelligent LED driver circuit 310 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 310 is manufactured by EldoLED.

LED driver circuit 310 can further include an AC or DC current source or voltage source, a regulator, an amplifier (such as a linear amplifier or switching amplifier), a buck, boost, or buck/boost converter, or any other similar type of circuit or component. LED driver circuit 310 outputs a variable voltage or current to the LED light source 320 that may include a DC offset, such that its average value is nonzero, and/or a AC voltage. The pilot LED 317 indicates the state of the luminaire 10, for example, during the commissioning, diagnostics and maintenance process.

For purposes of communication and control, luminaire 10 is treated as single addressable device that can be configured to operate as a member of one or more lighting control groups or zones. The luminaire 10 is line powered and remains operational as long as power is available.

Sensor/control module 315 includes power distribution circuitry 325, a micro-control unit (MCU) 330, drive/sense circuitry 335, and detector(s) 365. As shown, MCU 330 is coupled to LED driver circuit 310 and controls the light source operation of the LED light source 320. MCU 330 includes a memory 322 (volatile and non-volatile) and a central processing unit (CPU) 323. The memory 322 includes a lighting application 327 (which can be firmware) for both lighting control operations and commissioning, maintenance, and diagnostic operations. The power distribution circuitry 325 distributes power and ground voltages to the MCU 330, drive/sense circuitry 335, wireless transceivers 345 and 350, and detector(s) 365 to provide reliable operation of the various circuitry on the sensor/control module 315 chip.

Luminaire 10 also includes a dual-band wireless radio communication interface system configured for two way wireless communication. In our example, luminaire 10 has a radio set that includes radio 345 for sub-GHz communications and another radio 350 for Bluetooth RF communications. A first transceiver 345, such as a 900 MHz wireless transceiver, issues control operations on the lighting control network. This first transceiver 345 is for any-to-many communication, over a first of the two different wireless communication bands, of control and systems operations information, during luminaire operation and during control network operation over the first wireless communication band.

A second transceiver 350, such as a 2.4 GHz BLE (Bluetooth) wireless transceiver carries out commissioning, maintenance, and diagnostics of the lighting control network. This second transceiver 350 is for point-to-point communication, over a second of the two different wireless communication bands, of information other than the control and systems operations information, concurrently with at least some communications over the first wireless communication band.

As shown, the MCU 330 includes programming in the memory 322 which configures the CPU (processor) 323 to control operations of the respective luminaire 10, including the communications over the two different wireless communication bands via the dual-band wireless radio communication interface system 345, 350. The programming in the memory 322 includes a real-time operating system (RTOS) and further includes a lighting application 327 which is firmware/software that engages in communications with the commissioning/maintenance application 22 of mobile device 25 over the wireless out of band channel 7 of FIGS. 1A-B. The lighting application 327 programming in the memory 322 carries out lighting control operations over the lighting control network 5 of FIGS. 1A-B. The RTOS supports multiple concurrent processing threads for different simultaneous control or communication operations of the luminaire 10.

Three different CPU and memory architectures are shown for the sensor/control module 315 and the MCU 330 of the luminaire 10 in FIGS. 3A-C. In FIG. 3A, in addition to the memory 322 and the CPU 323 of the MCU 330 itself, the first transceiver 345 and the second transceiver 350 each include a separate memory (not shown) and a processor (not shown). Hence, in the example of FIG. 3A, the sensor/control module 15 includes a total of three processors and three sets of memory.

In FIG. 3B, the MCU 330 itself does not include a separate memory 322 and a CPU 323. Instead, only the first transceiver 345 and the second transceiver 350 each include a separate memory 322 and a processor 323. For efficiency purposes, such as to save manufacturing costs and conserve power (e.g., line power or battery power), the memory 322 and CPU 323 of the first transceiver 345 is selected to perform processing because the majority of processing (normal lighting control operations) occur over the sub-GHz wireless control network 5. Hence, in the example of FIG. 3B, the sensor/control module 315 includes a total of two processors and two sets of memory.

In FIG. 3C, the MCU 330 comprises a dual band system on chip (SOC) 345, 350 and the MCU 330 itself does not include a separate memory 322 and a CPU 323. Instead, the first transceiver 345 and the second transceiver 350 are integrated and combined into the chipset of the MCU 330. Hence, in the example of FIG. 3C, the sensor/control module 315 includes a total of one processor and one set of memory. Integrating the first transceiver 345 and second transceiver 350 into a dual band SOC chipset of the MCU 330, saves manufacturing costs and conserves power (e.g., line power or battery power).

As shown, luminaire 10 includes detector(s) 365, such as an in-fixture daylight sensor, an occupancy sensor, an audio sensor, a temperature sensor, or other environmental sensor. Detector(s) 365 may be based on Acuity Brands Lighting's commercially available xPoint® Wireless ES7 product. Drive/sense circuitry 335, such as application firmware, drives the in-fixture occupancy, audio, and photo sensor hardware. Outlined below are lighting controls and communications in the lighting control network that occur when drive/sense circuitry 335 of luminaire 10 detects state changes in the detector(s) 365, such as occupancy, daylight, and audio sensors.

Sensor State Change

When an occupancy sensor, daylight sensor, or audio sensor state change occurs is detected by drive/sense circuitry 335, MCU 330 of the luminaire 10 generates a global broadcast packet and a wireless message is created with the global broadcast packet as the payload. The message is sent to the group monitor via the transceiver radio 345 as reliable unicast (unless luminaire 10 is hosting the group monitor) by the lighting application 327 running on MCU.

If a gateway 50 (shown in FIGS. 1A-B) is present, a wireless gateway notification is created indicating the sensor, the sensor state (occupied or unoccupied, inhibiting or not inhibiting), the group, and the zone. The message is then unicast to the gateway 50 by the lighting application 327 running on MCU 330.

If the luminaire 10 misses acknowledgement of the wireless message indicating the sensor state change that luminaire 10 unicasted to group monitor within a predetermined time period, for example, then the luminaire 10 generates and issues/transmits a group multicast message indicating the sensor state change. No check message follow up is issued from the luminaire 10 following this multicast message, but such communication faults and anomalies are tallied by the luminaire 10 for health status reporting as described with reference to FIGS. 1A-B.

Group Monitor

The group monitor acknowledges receipt of the message (MAC layer) from the luminaire 10 indicating the sensor state change. The group monitor extracts the global broadcast packet from the message and creates a multicast message in response using the global broadcast packet as the payload indicating or specifying a lighting control event (e.g., turn on/off or dim a light source) and specifying a lighting control group, for example, using a lighting control group identifier. The global broadcast packet is temporarily saved. The group monitor transmits the multicast message at least three times, for example. The group monitor sends the global broadcast packet to the applications that share the processor with the group monitor. The group monitor interrogates the global broadcast packet to determine the type of control and the zone.

If a gateway 50 (see FIG. 1A) is present and the type of control is occupancy, daylight, or audio sensor related or the zone to make the adjustment to is global, a gateway notification is created indicating the sensor, its state (occupied or unoccupied, inhibiting or not inhibiting), the group, and the zone. The message is then reliably unicast to the gateway 50.

After interrogating the global broadcast to determine the type of control and zone, the group monitor uses the group table to look up the set of lighting system elements that are members of the zone. The group monitor forms a check message using the saved global broadcast as the payload. The group monitor sends the message reliable unicast to each device in the zone as a check to confirm the receipt of the multicast. This confirmation check is not made with the luminaire 10 that has the sensor that actually initiated the global broadcast event.

The group monitor service accommodates concurrent multiple occupancy, daylighting, or audio events irrespective of zone. The group monitor service cancels a confirmation check if it receives a state that obsolesces an active state in progress. In this case, the group monitor service starts a new confirmation check based on the latest state.

If the group monitor misses the unicast message from the luminaire 10 but gets the multicast issued by the luminaire 10—the group monitor executes the gateway and zone check described above.

Recipient Lighting System Elements

Upon receipt of a multicast message from the group monitor at a recipient lighting system element (e.g., luminaire, wall switch, plug load controller, or power pack) that was sent in response to the original message from luminaire 10, the recipient device checks the group indication and the counter. The message is discarded if the lighting system element is not a member of the identified lighting control group specified in the message. The message is also discarded if it is a duplicate (multicast switch state change events are transmitted at least three times, for example, by the group monitor).

The global broadcast payload is extracted from the multicast message and processed by the lighting application 327 running on the MCU 330. Upon receipt of the confirmation check, the message is acknowledged (MAC). The recipient lighting system element determines if it has already acted on the event. If not then the global broadcast payload is extracted from the unicast message and processed by the lighting application 327 running on the MCU 330. Applications are responsible for either processing the global broadcast or discarding it as out of zone scope.

For example, upon receipt of the multicast message from the lighting control group monitor at a respective recipient lighting system element, the respective recipient lighting system element checks a lighting control group identifier to determine whether the respective recipient control device is a member of the identified lighting control group in the message. The recipient lighting system element then determines whether the recipient lighting system element has already acted on a lighting control event (e.g., turn on/off or dim a light source) for lighting control network operation that is similar or identical to the event in the multicast message. If the recipient lighting system element has not already acted in accordance with the control event for lighting control operation, the recipient lighting system element adjusts one of its own LED light source(s) in accordance with the control event. Alternatively, if the recipient lighting system element has already acted on the lighting control event specified in the multicast message, no further action is taken in response by discarding the multicast message.

In an example, the scope of daylight light sensor control is that of the hosting luminaire 10 itself. Therefore events of this type may only be processed locally and not distributed over the lighting control network 5.

Figure 4A:
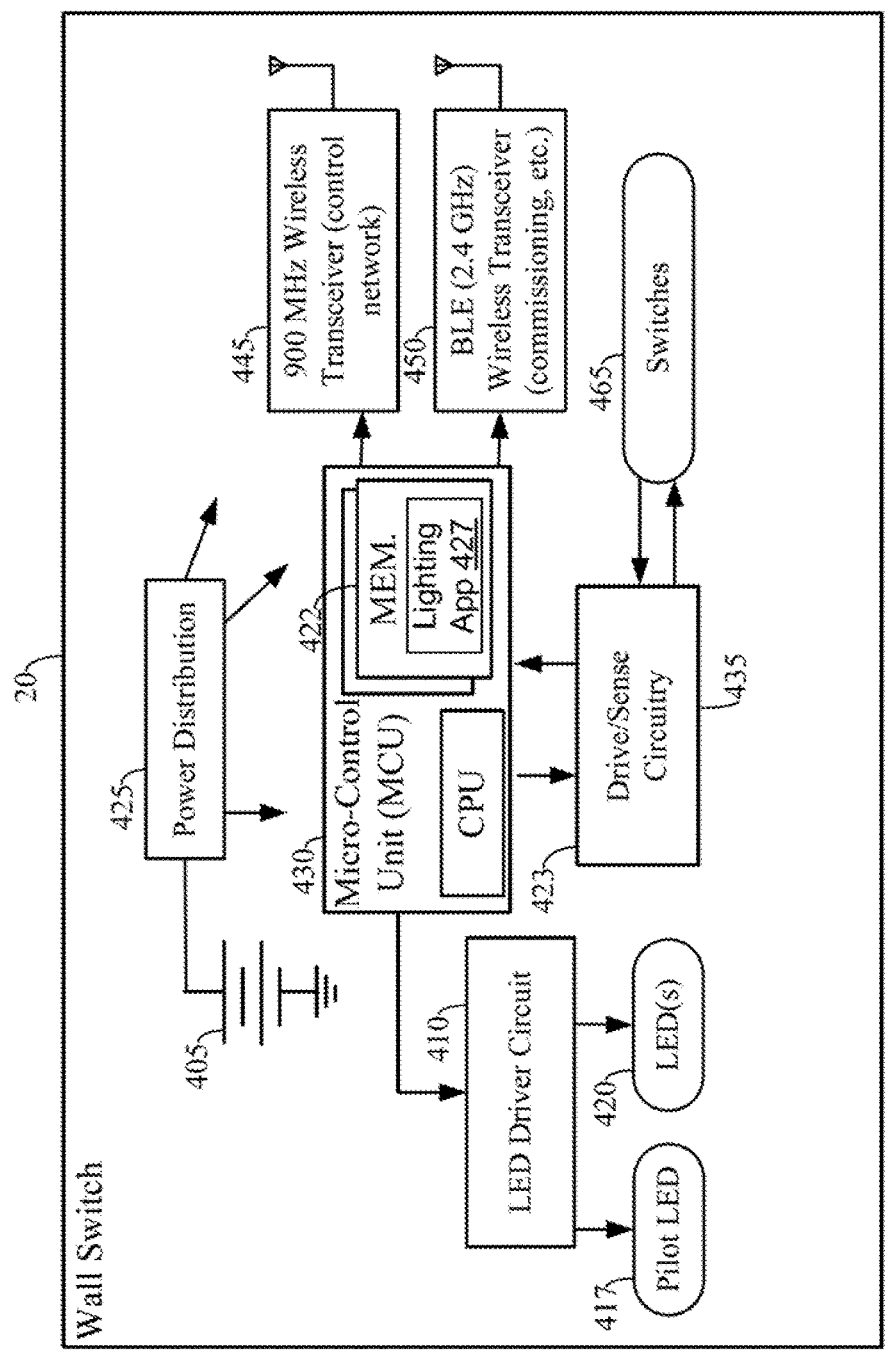
FIGS. 4A-C are block diagrams of examples of wall switches that communicate via the lighting control system of FIG. 1A or 1B.
Figure 4B:
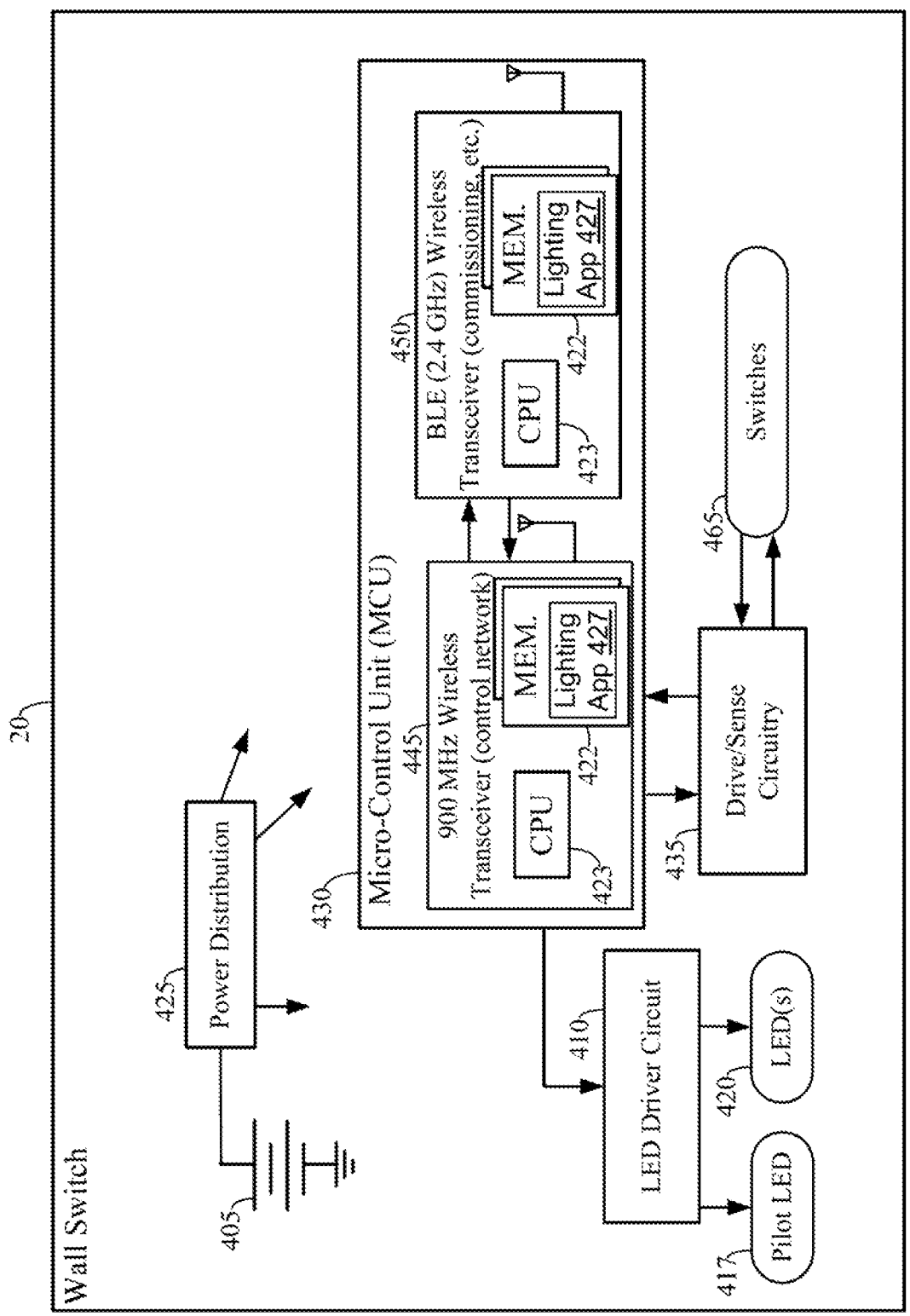
Figure 4C:
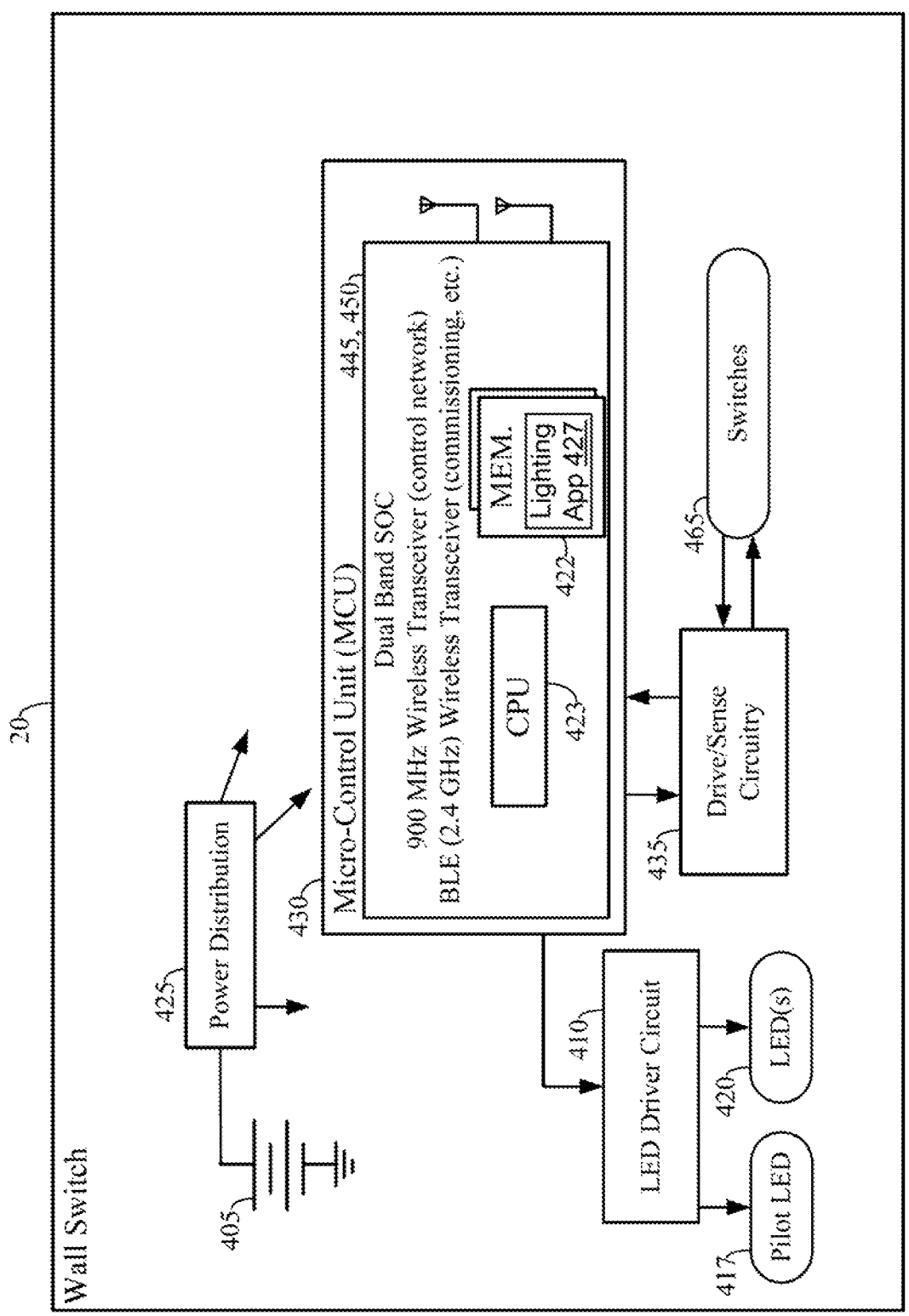

FIGS. 4A-C are block diagrams of a wall switch 20 that communicate via the lighting control system of FIGS. 1A-B. The circuitry, hardware, and software of wall switch 20 shown is similar to the luminaire 10 of FIG. 3. However, wall switch 20 is a controller that can be a battery powered device.

Wall switch 20 is similar to luminaire 10 in that they are singularly addressable devices that can be configured to operate as a member of one or more lighting control groups or zones. As shown, wall switch 20 includes a power supply 405, such as a battery or line power, to power itself. Wall switch 10 furthers include an LED driver circuit 410, and a light emitting diode(s) (LED) 420. LED driver circuit 410 is coupled to LED(s) 420 and drives that LED(s) 420 by regulating the power to LED(s) 420 by providing a constant quantity or power to LED light source 420 as its electrical properties change with temperature, for example. The LED driver circuit 410 includes a driver circuit that provides power to LED(s) 420 and a pilot LED 417. LED driver circuit 410 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 410 is manufactured by EldoLED.

LED driver circuit 410 can further include an AC or DC current source or voltage source, a regulator, an amplifier (such as a linear amplifier or switching amplifier), a buck, boost, or buck/boost converter, or any other similar type of circuit or component. LED driver circuit 410 outputs a variable voltage or current to the LED light source 420 that may include a DC offset, such that its average value is nonzero, and/or a AC voltage. The pilot LED 417 indicates the state of the wall switch 20, for example, during the commissioning, diagnostics and maintenance process.

As shown, an MCU 430 is coupled to LED driver circuit 410 and controls the light source operation of the LED(s) 420. MCU 430 includes a memory 422 (volatile and non-volatile) and a central processing unit (CPU) 423. The memory 422 includes a lighting application 427 (which can be firmware) for both lighting control operations and commissioning/maintenance operations. The power distribution circuitry 425 distributes power and ground voltages to the LED driver circuit 410, MCU 430, drive/sense circuitry 435, wireless transceivers 445 and 450, and switches 465 to provide reliable operation of the various circuitry on the wall switch 20.

Wall switch 20 also includes a dual-band wireless radio communication interface system configured for two way wireless communication. In our example, wall switch 12 has a radio set that includes radio 445 for sub-GHz communications and another radio 450 for Bluetooth RF communication. A first transceiver 445, such as a 900 MHz wireless transceiver, issues control operations on the lighting control network. This first transceiver 445 is for any-to-many communication, over a first of the two different wireless communication bands, of control and systems operations information, during luminaire operation and during control network operation over the first wireless communication band.

A second transceiver 450, such as a 2.4 GHz BLE (Bluetooth) wireless transceiver carries out commissioning, diagnostics and maintenance of the lighting control network. This second transceiver 450 is for point-to-point communication, over a second of the two different wireless communication bands, of information other than the control and systems operations information, concurrently with at least some communications over the first wireless communication band.

As shown, the MCU 430 includes programming in the memory 422 which configures the CPU (processor) 423 to control operations of the respective wall switch 20, including the communications over the two different wireless communication bands via the dual-band wireless radio communication interface system 445, 450. The programming in the memory 422 includes a real-time operating system (RTOS) and further includes a lighting application 427 which is firmware/software that engages in communications with the commissioning/maintenance application 22 of mobile device 25 over the wireless out of band channel 7 of FIGS. 1A-B. The lighting application 427 programming in the memory 422 carries out lighting control operations over the lighting control network 5 of FIGS. 1A-B. The RTOS supports multiple concurrent processing threads for different simultaneous control or communication operations of the wall switch 20.

Three different CPU and memory architectures are shown for the MCU 430 of the wall switch 20 in FIGS. 4A-C. In FIG. 4A, in addition to the memory 422 and the CPU 423 of the MCU 430 itself, the first transceiver 445 and the second transceiver 450 each include a separate memory (not shown) and a processor (not shown). Hence, in the example of FIG. 4A, the MCU 430, first transceiver 445, and second transceiver 450 combine to include a total of three processors and three sets of memory.

In FIG. 4B, the MCU 430 itself does not include a separate memory 422 and a CPU 423. Instead, only the first transceiver 445 and the second transceiver 450 each include a separate memory 422 and a processor 423. For efficiency purposes, such as to save manufacturing costs and conserve power (e.g., line power or battery power), the memory 422 and CPU 423 of the first transceiver 445 is selected to perform processing because the majority of processing (normal lighting control operations) occur over the sub-GHz wireless control network 5. Hence, in the example of FIG. 4B, the sensor/control module 415 includes a total of two processors and two sets of memory.

In FIG. 4C, the MCU 430 comprises a dual band system on chip (SOC) 445, 450 and the MCU 430 itself does not include a separate memory 422 and a CPU 423. Instead, the first transceiver 445 and the second transceiver 450 are integrated and combined into the chipset of the MCU 430. Hence, in the example of FIG. 4C, the MCU 430 includes a total of one processor and one set of memory. Integrating the first transceiver 445 and second transceiver 450 into a dual band SOC chipset of the MCU 330, saves manufacturing costs and conserves power (e.g., line power or battery power).

As shown, wall switch 20 includes switches 465, such as a dimmer switch, set scene switch. Switches 465 can be or include sensors, such as infrared sensors for occupancy or motion detection, an in-fixture daylight sensor, an audio sensor, a temperature sensor, or other environmental sensor. Switches 465 may be based on Acuity Brands Lighting's commercially available xPoint® Wireless ES7 product. Drive/sense circuitry 435, such as application firmware, drives the occupancy, audio, and photo sensor hardware.

In our example, wall switch 20 includes a single shared button switch 465 for on/off functions that requires knowledge of state to differentiate between on and off. The wireless control network 5 communicates output device (luminaire 10, plug load controller 30, power pack 35) state to the wall switches 20 as a means of providing the differentiating state. However, the wireless control network 5 suppresses the communication of output devices to constrain network traffic. Therefore control network 5 will rely on the default mechanism (tracked on the device) for determining on/off on all of the types of wall switch. It is therefore possible for the wall switch 20 to occasionally be out of sync with the actual state of the zone particularly at installation commissioning time. Toggling the switch button 465 one or more times will clear any mismatched state. In our example, wireless control network 5 does not communicate load state via the pilot LED 417 of wall switch 20) 20; however, in other examples wireless control network 5 communicates load state via the pilot LED 417 of wall switch 20.

Outlined below are lighting controls and communications in the lighting control network that occur when drive/sense circuitry 435 detects state changes in the switches 365 of wall switch 20.

Wall Switch Button Pushed

When the on switch 465 is pushed, the lighting application 427 running on MCU 430 generates a global broadcast packet indicating the control event. A wireless message is created with the global broadcast packet as the payload. The message is sent to the group monitor as reliable unicast. If a gateway 50 (see FIG. 1A) is present and if the global broadcast is a switch on/off control, then a gateway notification is created indicating the wall switch 20, the state of the wall switch 20, the group, and the zone. The message is unicasted to the gateway 50.

If the wall switch 20 is a battery powered (sleepy) type wall switch which uses a sleep feature as a means of power conservation and thus requires a special mechanism to acquire certain communications upon wake up, the following extension is used. The wall switch 20 detects the button push and turns on the transceiver radio 445 and transmits the wireless message with the global broadcast packet as the payload. Next, the wall switch 20 cancels its wake up timer. The timer wakes the device to check its mailbox in the case where no button push has occurred for a while. The wall switch 20 sends a request for communications to the mail box server on the group monitor. The group monitor returns the contents of the mailbox addressed to the wall switch.

The wall switch 20 processes each request. Examples include a request for health status or a state change request. The wall switch sets it wake up timer and the timer period is directly related to the frequency of system health reporting. The lighting application 427 de-bounces a continual or rapid button depress sequence so as to not create a message storm at the group monitor. If the wall switch 20 doesn't receive the acknowledgment from the group monitor when the global broadcast packet is unicasted to the group monitor, then the switch will generate and issue the group multicast. In this instance, no check message follow up is issued from the wall switch 20. Communication faults and anomalies are tallied by the switch for health status reporting as described previously with reference to luminaire 10.

Group Monitor

The group monitor acknowledges (MAC layer) receipt of the message from the wall switch 20 indicating pushing of the on switch 465. The group monitor extracts the global broadcast packet from the message and creates a multicast message in response using the global broadcast packet as the payload indicating or specifying a lighting control event (e.g., turn on/off or dim a light source) and specifying a lighting control group, for example, using a lighting control group identifier. The global broadcast packet is temporarily saved.

The group monitor transmits the multicast message at least three times, for example. The group monitor sends the global broadcast packet to the applications that share the processor with the group monitor. The group monitor interrogates the global broadcast packet to determine the type of control and the zone.

If a gateway 50 (see FIG. 1A) is present and the type of control is a switch on/off or the zone to make the adjustment to is global, then a gateway notification is created indicating the state of the switch, the group, and the zone. The message is reliably unicast to the gateway 50.

The group monitor uses the group table to look up the set of devices that are members of the zone. The group monitor forms a check message using the saved global broadcast as the payload. The group monitor sends the message (reliable unicast) to each lighting system element in the zone as a check to confirm the receipt of the multicast. Of note, the confirmation check is not made with the wall switch 20 that actually initiated the control event.

The group monitor service accommodates concurrent multiple switch on/off events irrespective of zone. The group monitor service cancels a confirmation check if it receives a state that obsolesces an active state in progress. In this case the group monitor service starts a new confirmation check based on the latest state. If the group monitor misses the unicast message from the switch but gets the multicast issued by the switch—the group monitor executes the gateway and zone check described above.

Recipient Lighting System Elements

Upon receipt of a multicast message from the group monitor at a recipient lighting system element (e.g., luminaire, wall switch, plug load controller, or power pack) that was sent in response to the original message from wall switch 20, the recipient device checks the group indication and the counter. The message is discarded if the recipient device is not a member of the identified lighting control group specified in the message. The message is also discarded if it is a duplicate (multicast switch state change events are transmitted at least three times, for example, by the group monitor). The global broadcast payload is extracted from the multicast message and processed by the lighting application 427 running on the MCU 430. Upon receipt of the confirmation check, the message is acknowledged (MAC).

The recipient lighting system element determines if it has already acted on the event. If not then the global broadcast payload is extracted from the unicast message and processed by the lighting application 427. The applications are responsible for either processing the global broadcast or discarding it as out of zone scope.

For example, upon receipt of the multicast message from the lighting control group monitor at a respective recipient lighting system element, the respective recipient lighting system element checks a lighting control group identifier to determine whether the respective recipient control device is a member of the identified lighting control group in the message. The recipient lighting system element then determines whether the recipient lighting system element has already acted on a lighting control event (turn on/off or dim)

for lighting control network operation that is similar or identical to the event in the multicast message. If the recipient lighting system element has not already acted in accordance with the control event for lighting control operation, the recipient lighting system element adjusts one of its own LED light source(s) in accordance with the control event. Alternatively, if the recipient lighting system element has already acted on the lighting control event specified in the multicast message, no further action is taken in response by discarding the multicast message.

Figure 5:
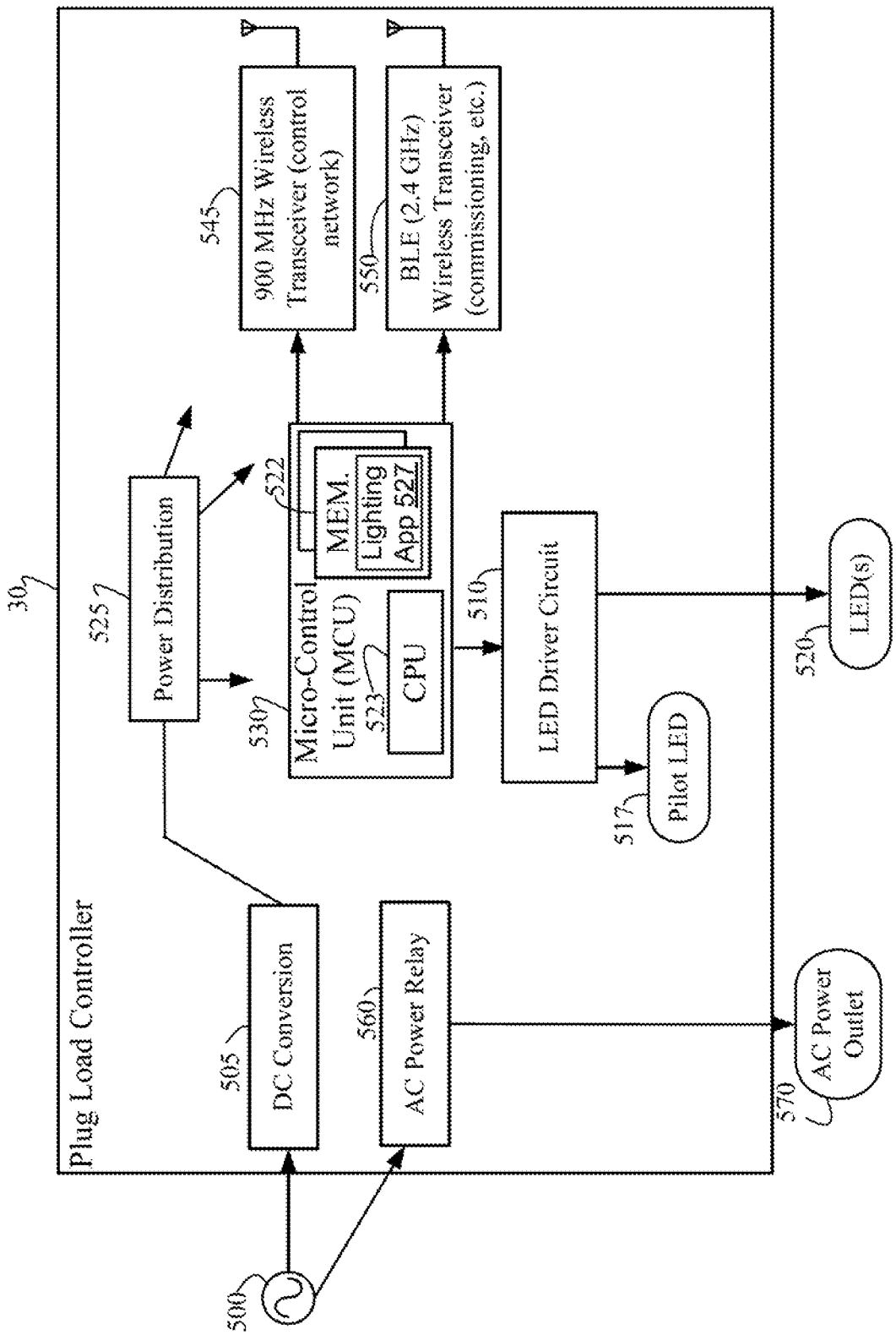
FIG. 5 is a block diagram of a plug load controller that communicates via the lighting control system of FIG. 1B.

FIG. 5 is a block diagram of a plug load controller 30 that communicates via the lighting control system of FIG. 1B. The circuitry, hardware, and software of plug load controller 30 shown is similar to the luminaire 10 of FIG. 3. However, plug load controller 30 is a retrofit device that plugs into existing AC wall outlets, for example, and allows existing wired lighting devices, such as table lamps or floor lamps that plug into a wall outlet, to operate in the lighting control system. The plug load controller 30 instantiates the table lamp or floor lamp by allowing for commissioning, diagnostics and maintenance operations and processes wireless lighting controls in order to the allow the lighting device to operate in the lighting control system.

Plug load controller 30 is similar to luminaire 10 in that they are singularly addressable devices that can be configured to operate as a member of one or more lighting control groups or zones. As shown, plug load controller 30 includes a DC conversion circuit 505 (which may instead be a power supply) driven by a power source 500, in our example, an AC line or mains. Power source 500, however, may be a battery, solar panel, or any other AC or DC source.

DC conversion circuit 505 receives power from the power source 500, and may include a magnetic transformer, electronic transformer, switching converter, rectifier, or any other similar type of circuit to convert an input power signal into a suitable power signal to power itself. Plug load controller 500 further comprises an AC power relay 560 which relays incoming AC power from power source 500 to other devices that may plug into the receptacle of plug load controller 30 thus providing an AC power outlet 570.

Plug load controller 30 furthers include an LED driver circuit 510 and a light emitting diode(s) (LED) 520. LED driver circuit 510 is coupled to LED(s) 520 and drives that LED(s) 520 by regulating the power to LED(s) 520 by providing a constant quantity or power to LED(s) 520 as its electrical properties change with temperature, for example. The LED driver circuit 510 includes a driver circuit that provides power to LED(s) 520 and a pilot LED 517. LED driver circuit 510 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 510 is manufactured by EldoLED.

LED driver circuit 510 can further include an AC or DC current source or voltage source, a regulator, an amplifier (such as a linear amplifier or switching amplifier), a buck, boost, or buck/boost converter, or any other similar type of circuit or component. LED driver circuit 510 outputs a variable voltage or current to the LED(s) 520 that may include a DC offset, such that its average value is nonzero, and/or a AC voltage. The pilot LED 417 indicates the state of the plug load controller 30, for example, during the commissioning, diagnostics and maintenance process.

For purposes of communication and control, plug load controller 30 is treated as single addressable device that can be configured to operate as a member of one or more lighting control groups or zones. The plug load controller 30 is line powered and remains operational as long as power is available.

Plug load controller 30 includes power distribution circuitry 525 and a micro-control unit (MCU) 530. As shown, MCU 530 is coupled to LED driver circuit 510 and controls the light source operation of the LED(s) 520. MCU 530 includes a memory 522 (volatile and non-volatile) and a central processing unit (CPU) 523. The memory 522 includes a lighting application 527 (which can be firmware) for both lighting control operations and commissioning/maintenance operations. The power distribution circuitry 525 distributes power and ground voltages to the LED driver circuit 510, MCU 530, and wireless transceivers 545 and 550 to provide reliable operation of the various circuitry on the plug load controller 30 chip.

Plug load controller 30 also includes a dual-band wireless radio communication interface system configured for two way wireless communication. In our example, plug load controller 30 has a radio set that includes radio 545 for sub-GHz communications and another radio 550 for Bluetooth RF communications. A first transceiver 545, such as a 900 MHz wireless transceiver, issues control operations on the lighting control network. This first transceiver 545 is for any-to-many communication, over a first of the two different wireless communication bands, of control and systems operations information, during luminaire operation and during control network operation over the first wireless communication band.

A second transceiver 550, such as a 2.4 GHz BLE (Bluetooth) wireless transceiver carries out commissioning, diagnostics and maintenance of the lighting control network. This second transceiver 550 is for point-to-point communication, over a second of the two different wireless communication bands, of information other than the control and systems operations information, concurrently with at least some communications over the first wireless communication band.

As shown, the MCU 530 includes programming in the memory 522 which configures the CPU (processor) 523 to control operations of the respective plug load controller 30, including the communications over the two different wireless communication bands via the dual-band wireless radio communication interface system 545, 550. The programming in the memory 522 includes a real-time operating system (RTOS) and further includes a lighting application 527 which is firmware/software that engages in communications with the commissioning/maintenance application 22 of mobile device 25 over the wireless out of band channel 7 of FIGS. 1A-B. The lighting application 527 programming in the memory 522 carries out lighting control operations over the lighting control network 5 of FIGS. 1A-B. The RTOS supports multiple concurrent processing threads for different simultaneous control or communication operations of the plug load controller 30.

Although not shown, it should be understood that the MCU 530 of plug load controller 30 may be of the three different CPU and memory architectures depicted and described for the luminaire 10 in FIGS. 3A-C and the wall switch 20 in FIGS. 4A-C. As explained earlier, integrating the first transceiver 545 and second transceiver 550, for example, into a dual band SOC chipset of the MCU 530, saves manufacturing costs and conserves power (e.g., line power or battery power).

Plug load controller 30 may include detector(s), such as a daylight sensor, an occupancy sensor, an audio sensor, a temperature sensor, or other environmental sensor (not shown). Detector(s) may be based on Acuity Brands Lighting's commercially available xPoint® Wireless ES7 product. Drive/sense circuitry (not shown), such as application firmware, can drive the occupancy and photo sensor hardware.

Figure 6:
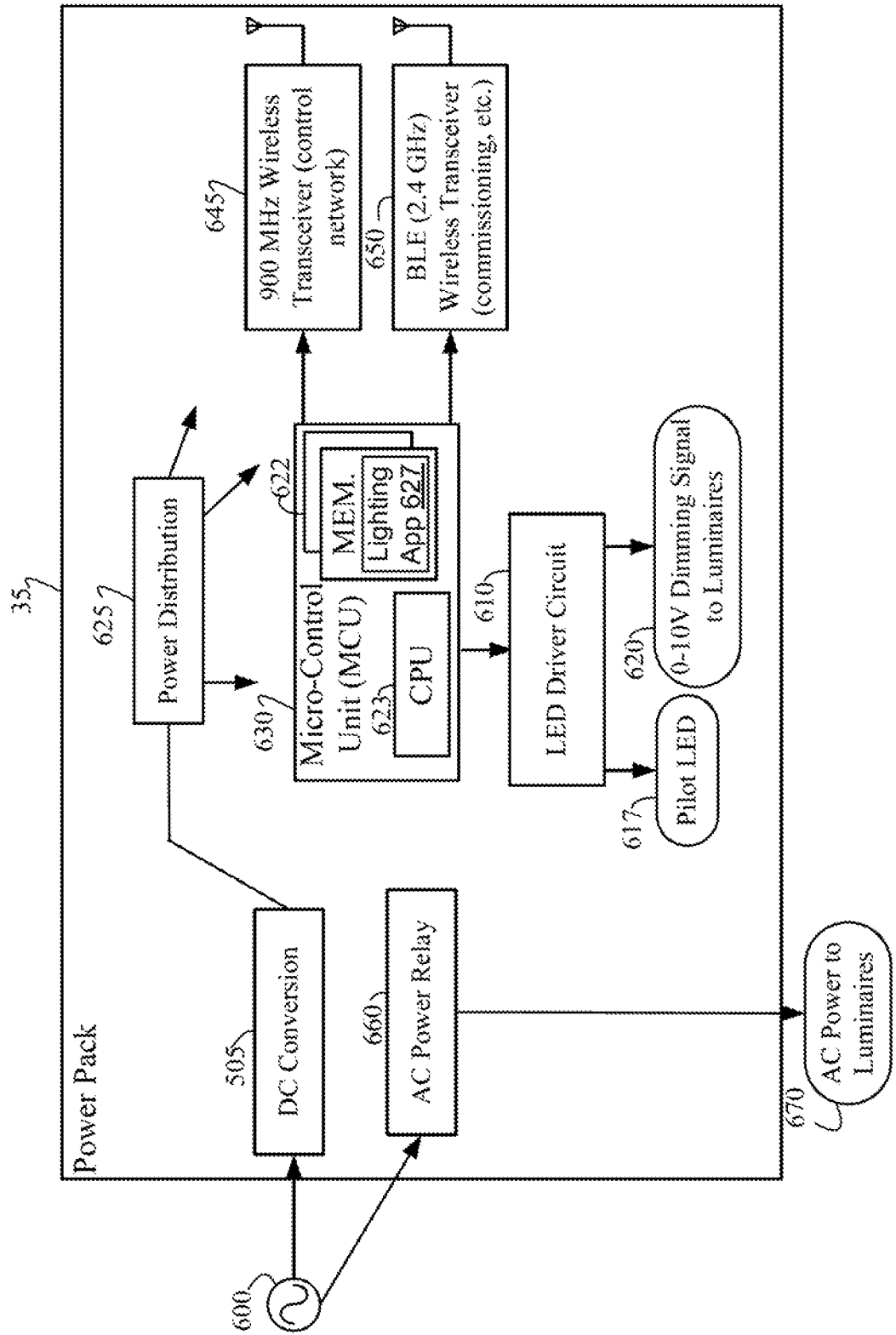
FIG. 6 is a block diagram of a power pack that communicates via the lighting control system of FIG. 1B.

FIG. 6 is a block diagram of a power pack 35 that communicates via the lighting control system of FIG. 1B. The circuitry, hardware, and software of power pack 35 shown is similar to the luminaire 10 of FIG. 3. However, power pack 35 is a device that retrofits with existing wired light fixtures (luminaires). The power pack 35 instantiates the wired light fixture by allowing for commissioning, diagnostics and maintenance operations and processes wireless lighting controls in order to allow the lighting device to operate in the lighting control system.

Power pack 35 is similar to luminaire 10 in that they are singularly addressable devices that can be configured to operate as a member of one or more lighting control groups or zones. As shown, power pack 35 includes a DC conversion circuit 605 (which may instead be a power supply) driven by a power source 600, in our example, an AC line or mains. Power source 600, however, may be a battery, solar panel, or any other AC or DC source.

DC conversion circuit 605 receives power from the power source 600, and may include a magnetic transformer, electronic transformer, switching converter, rectifier, or any other similar type of circuit to convert an input power signal into a suitable power signal to power itself. Power pack 35 further comprises an AC power relay 660 which relays incoming AC power from power source 600 to the existing wired luminaire.

Power pack 35 furthers include an LED driver circuit 610. LED driver circuit 610 is coupled to luminaire and drives that luminaire by regulating a driving signal, in our example, a 0-10V dimming signal 620. The LED driver circuit 610 includes a driver circuit that provides power to a pilot LED 617 and a dimming signal to luminaire 620. LED driver circuit 610 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 610 is manufactured by EldoLED.

LED driver circuit 610 can further include an AC or DC current source or voltage source, a regulator, an amplifier (such as a linear amplifier or switching amplifier), a buck, boost, or buck/boost converter, or any other similar type of circuit or component. LED driver circuit 610 outputs a variable voltage or current as the dimming signal to luminaire(s) 620 that may include a DC offset, such that its average value is nonzero, and/or a AC voltage. The pilot LED 617 indicates the state of the power pack 35, for example, during the commissioning, diagnostics and maintenance process.

For purposes of communication and control, power pack 35 is treated as single addressable device that can be configured to operate as a member of one or more lighting control groups or zones. The power pack 35 is line powered and remains operational as long as power is available.

Power pack 35 includes power distribution circuitry 625 and a micro-control unit (MCU) 630. As shown, MCU 630 is coupled to LED driver circuit 610 and controls the light source operation of the luminaire via the dimming signal to luminaire 620. MCU 630 includes a memory 622 (volatile and non-volatile) and a central processing unit (CPU) 623.

The memory 622 includes a lighting application 627 (which can be firmware) for both lighting control operations and commissioning/maintenance operations. The power distribution circuitry 625 distributes power and ground voltages to the LED driver circuit 610, MCU 630, and wireless transceivers 645 and 650 to provide reliable operation of the various circuitry on the power pack 35 chip.

Power pack 35 also includes a dual-band wireless radio communication interface system configured for two way wireless communication. In our example, power pack 35 has a radio set that includes radio 645 for sub-GHz communications and another radio 650 for Bluetooth RF communications. A first transceiver 645, such as a 900 MHz wireless transceiver, issues control operations on the lighting control network. This first transceiver 645 is for any-to-many communication, over a first of the two different wireless communication bands, of control and systems operations information, during luminaire operation and during control network operation over the first wireless communication band.

A second transceiver 650, such as a 2.4 GHz BLE (Bluetooth) wireless transceiver carries out commissioning, diagnostics and maintenance of the lighting control network. This second transceiver 650 is for point-to-point communication, over a second of the two different wireless communication bands, of information other than the control and systems operations information, concurrently with at least some communications over the first wireless communication band.

As shown, the MCU 630 includes programming in the memory 622 which configures the CPU (processor) 623 to control operations of the respective power pack 35, including the communications over the two different wireless communication bands via the dual-band wireless radio communication interface system 645, 650. The programming in the memory 622 includes a real-time operating system (RTOS) and further includes a lighting application 627 which is firmware/software that engages in communications with the commissioning/maintenance application 22 of mobile device 25 over the wireless out of band channel 7 of FIGS. 1A-B. The lighting application 627 programming in the memory 622 carries out lighting control operations over the lighting control network 5 of FIGS. 1A-B. The RTOS supports multiple concurrent processing threads for different simultaneous control or communication operations of the power pack 35.

Although not shown, it should be understood that the MCU 630 of power pack 35 may be of the three different CPU and memory architectures depicted and described for the luminaire 10 in FIGS. 3A-C and the wall switch 20 in FIGS. 4A-C. As explained earlier, integrating the first transceiver 645 and second transceiver 650, for example, into a dual band SOC chipset of the MCU 630, saves manufacturing costs and conserves power (e.g., line power or battery power).

Power pack 35 may include detector(s), such as a daylight sensor, an occupancy sensor, an audio sensor, a temperature sensor, or other environmental sensor (not shown). Detector(s) may be based on Acuity Brands Lighting's commercially available xPoint® Wireless ES7 product. Drive/sense circuitry (not shown), such as application firmware, can drive the occupancy and photo sensor hardware.

Figure 7:
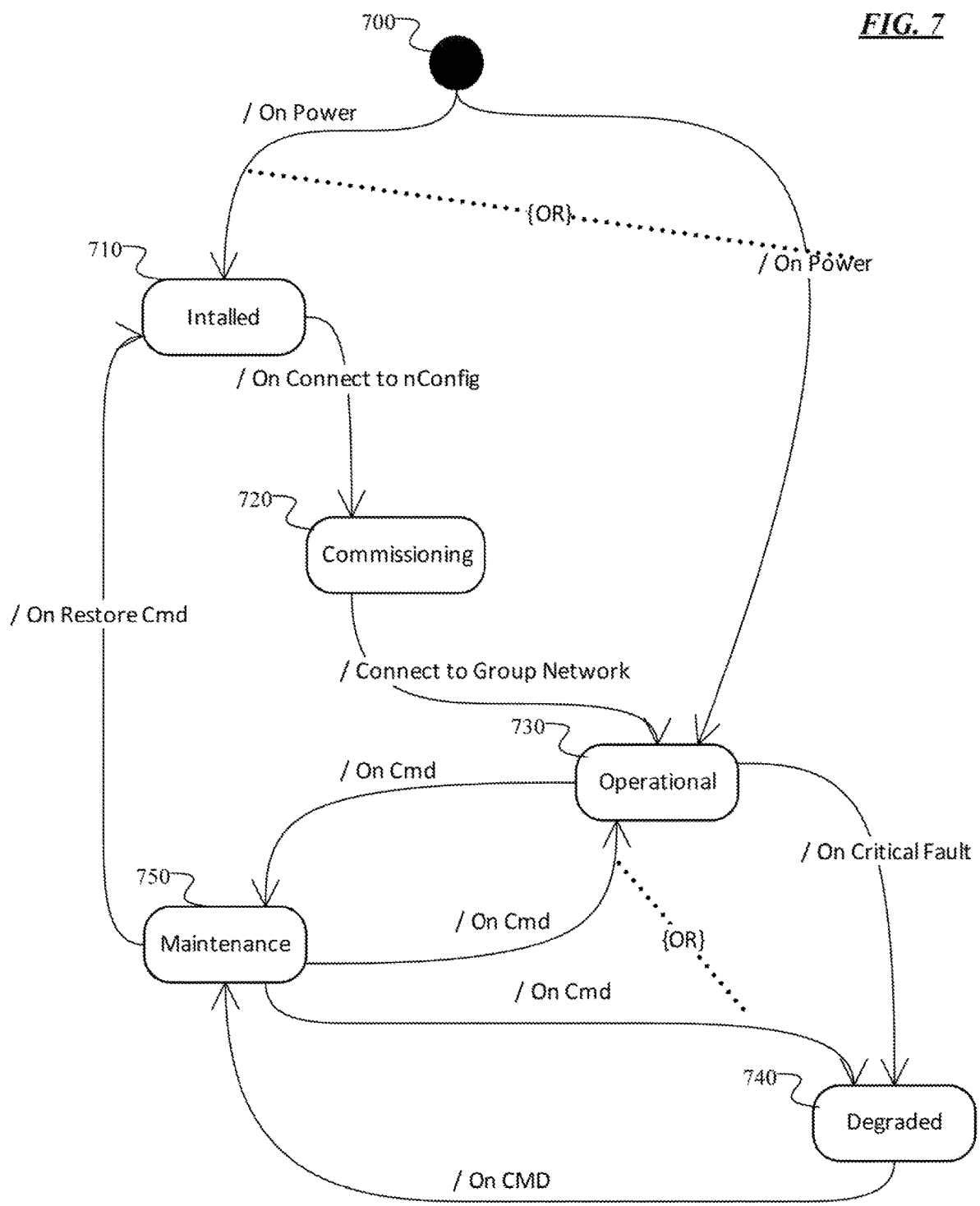
FIG. 7 is a flow chart presenting the states and transitions for the various lighting system elements in the system examples of FIGS. 1A-B.

FIG. 7 is a flow chart presenting the states and transitions for the various lighting system elements of FIGS. 1A-B. As shown in FIG. 7, the various lighting system elements (luminaires 10A-N, wall switches 20A-N, plug load controller 30, and power pack 35) go through a series of states and transitions during commissioning of the lighting control system, when lighting control operations are executed, and during maintenance.

Beginning in block 700, lighting system elements are not yet powered up or installed. Moving now to block 710, upon power up after installation the lighting system elements behave as autonomous devices. There is no sub-GHz sub-network to provide collaborative control, however the lighting system elements begin BLE beaconing to identify themselves to a commissioning/maintenance application 22 executing on a mobile device 25.

Upon power up, luminaires 10A-N enter an autonomous control mode that permits the integrated detector(s) (e.g., occupancy, daylight/photo, or audio sensors) to exert limited control (lights on/off, dim up/down) of the light fixture. The control behavior is defined as default settings for the device.

After power up, wall switches 20A-N may turn off their beacons after a predetermined time period (e.g., one hour) after powering up in order to conserve battery life. While in an installed state, the wall switches 20A-N can be induced to restart their beacons by pushing any button offered. For example, the wall switches 20A-N switch off their beacons after a predetermined time period (e.g., one hour) after a button push.

On board pilot LEDs of the luminaires 10A-N, wall switches 20A-N, and other lighting system elements visually signal the state of the lighting system element (for all states) as an aid to the system installer and maintainer that is operating the commissioning/maintenance application 22 on the mobile device 25. The pilot LED goes off when the lighting system element is in an installed state.

Continuing now to block 720, the luminaires 10A-N, wall switches 20A-N, and other lighting system elements enter a commissioning state from the installed state upon connection to the commissioning/maintenance application 22 of the mobile device 25. The luminaires 10A-N, wall switches 20A-N, and other lighting system elements receive configuration information via the commissioning/maintenance application 22 and will transition to an operational state upon completing the commissioning process and connecting to the group subnetwork.

The advertising beacon signals a sub-state while the luminaires 10A-N and wall switches 20A-N undergo commissioning. The luminaires 10A-N, wall switches 20A-N, and other lighting system elements advertise an un-configured sub-state until completion of MAC-PHY configuration. Afterwards and until operational, the wall switches 20A-N or luminaires 10A-N advertise a waiting-connect (sub-GHz net) sub-state. Each of the luminaires 10A-N, wall switches 20A-N, and other lighting system elements is commanded to issue a blink during its commissioning phase, otherwise the LED is off.

Proceeding now to block 730, the luminaires 10A-N, wall switches 20A-N, and other lighting system elements participate in collaborative group and zone lighting control while in an operational state. For example, sensors 365 of luminaires 10A-N, wall switches 20A-N, and other lighting system elements affect zone behavior by signaling control measures to the lighting elements in the zone's fixtures.

As a security measure all luminaires 10A-N, wall switches 20A-N, and other lighting system elements, with the exception of the group monitor, cease BLE beaconing during the operational state. The group monitor changes its advertisement to indicate its role as the group monitor and its state (operational). The pilot LED remains off during the operational state.

Continuing now to block 740, depending on condition, luminaires 10A-N, wall switches 20A-N, and other lighting system elements experiencing faults may enter a degraded state where partial capability is available. It may be possible to correct a degraded state through the commissioning/maintenance application 22 of the mobile device 25. In this case, the degraded luminaires 10A-N, wall switches 20A-N, and other lighting system elements are commanded to switch to the maintenance state, the commissioning/maintenance application 22 of the mobile device 25 is connected, a fix is attempted, and the device transitions to either operational state or back to degraded state depending on outcome of fix. Pilot LEDs can issue a bright S-O-S indication of three rapid blinks, three off counts, and three rapid blinks while in degraded state. Upon button push, wall switches issue the same S-O-S type of signal 5 times and then cease activity to conserve battery power.

Moving now to block 750, luminaires 10A-N, wall switches 20A-N, and other lighting system elements can be commanded to enter a maintenance state. The command arrives over the lighting control network (sub-GHz network) from the group monitor. The luminaires 10A-N, wall switches 20A-N, and other lighting system elements maintain full or degraded operating capability while in the maintenance state. The luminaires 10A-N, wall switches 20A-N, and other lighting system elements resume BLE advertising (state=maintenance) seeking connection with commissioning/maintenance application 22 of the mobile device 25. Luminaires 10A-N, wall switches 20A-N, and other lighting system elements can then be re-configured via the commissioning/maintenance application 22 of the mobile device 25. The luminaires 10A-N, wall switches 20A-N, and other lighting system elements transition to an operational (or degraded) state upon command to exit the maintenance state. The pilot LED executes a continuous bright blink when in the maintenance state. Upon button push, wall switches 20A-N issue the same continuous bright blink type of signal 5 times and then cease LED activity to conserve battery power.

Figure 8:
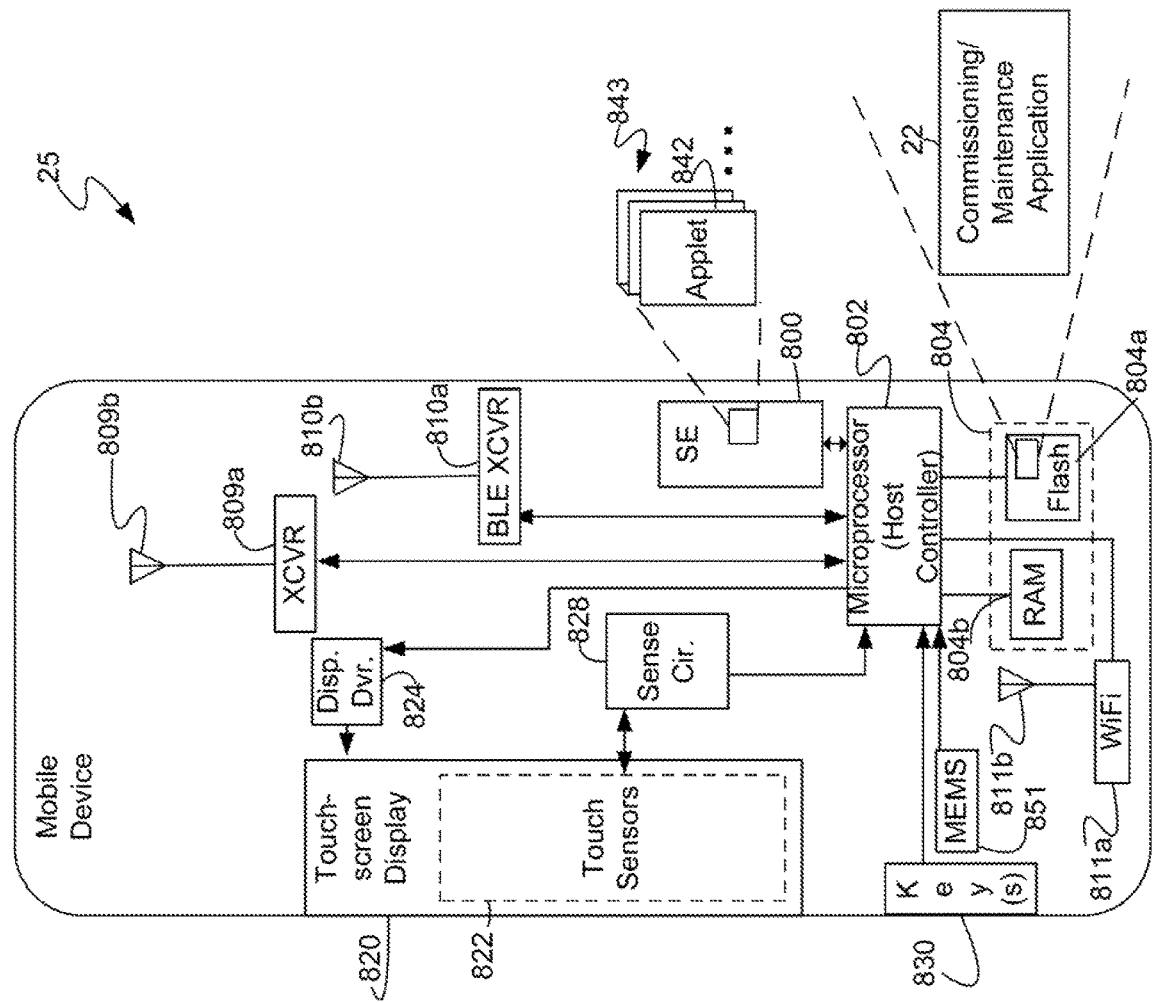
FIG. 8 is a high-level functional block diagram of a mobile device for commissioning, diagnostics and maintenance of the lighting control system of FIG. 1A or 1B.

FIG. 8 is a high-level functional block diagram of a mobile device 25 for commissioning, diagnostics and maintenance of the lighting control system of FIGS. 1A-B. Shown are elements of a touch screen type of mobile device 25 having the commissioning/maintenance application 22 loaded, although other non-touch type mobile devices can be used in the prior token-based communications under consideration here. Examples of touch screen type mobile devices that may be used include (but are not limited to) a smart phone, a personal digital assistant (PDA), a tablet computer or other portable device. However, the structure and operation of the touch screen type devices 25 is provided by way of example; and the subject technology as described herein is not intended to be limited thereto. For purposes of this discussion, FIG. 8 therefore provides a block diagram illustration of the example of mobile device 25 having a touch screen display for displaying content and receiving user input as (or as part of) the user interface.

The activities that are the focus of discussions here typically involve data communications. As shown in FIG. 8, the mobile device 25 includes a first digital transceiver (XCVR) 809a, for digital wireless communications via a wide area wireless mobile communication network and second digital XCVR 810a for digital wireless communications via a Bluetooth network, although the mobile device 25 may include additional digital or analog transceivers (not shown).

The transceiver 810a (network communication interface) conforms to one or more of the various digital wireless communication standards for Bluetooth communications. As discussed previously, communications through the Bluetooth transceiver 810a and the wireless out of band channel 7 shown in FIGS. 1A-B relate to protocols and procedures in support of commissioning and maintaining lighting system elements, including luminaires 10A-N, wall switches 20A-N, plug load controller 30, and power pack 35. In addition, communications to gateway 50 are also supported. Such communications, for example, may utilize IP packet data transport utilizing the digital wireless transceiver (XCVR) 810a and over the air communications via wireless out of band channel 7 shown in FIGS. 1A-B. Transceiver 810a connects through radio frequency (RF) send-and-receive amplifiers (not shown) to an antenna 810b.

The transceiver 809a (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 809a provides two-way wireless communication of information including digitized audio signals, still image and/or video signals, web page information for display as well as web related inputs, and various types of mobile message communications to/from the mobile device 25.

In one example, the transceiver 809a sends and receives a variety of signaling messages in support of various data services provided by a network of a wireless service provider, to user(s) of mobile device 25 via a mobile communication network (not shown). Transceiver 809a also connects through radio frequency (RF) send-and-receive amplifiers (not shown) to an antenna 809b.

Many modern mobile device(s) 25 also support wireless local area network communications over WiFi, instead of or in addition to data communications using the wide area mobile communication network. Hence, in the example of FIG. 8, for packet data communications, mobile device 25 may also include a WiFi transceiver 811a and associated antenna 811b. Although WiFi is used here as the example, the transceiver 811a may take the form of any available two-way wireless local area network (WLAN) transceiver of a type that is compatible with one or more standard protocols of communication implemented in wireless local area networks, such as one of the WiFi standards under IEEE 802.11 and/or WiMAX.

The transceiver 811a, for example, may provide two-way data transport for wireless communication with a wireless access point in a residence or enterprise that the user frequents or with any available hotspot offered in a public venue. A WiFi access point (not shown), communicates with compatible user equipment, such as the mobile device 25, over the air using the applicable WiFi protocol. The WiFi access point provides network connectivity, usually to a wide area network 55 (as shown in FIGS. 1A-B), such as the Internet. In a home or office premises, for example, the WiFi access point would connect directly or via a local area network (LAN) to a line providing internet access service. In a more public venue, an access point configured as a hotspot may offer similar connectivity for customers or others using the venue, on terms and conditions set by the venue operator. Although communicating through a different network or networks, the transceiver 811a supports various types of data communications similar to the packet data communications supported via the mobile network transceiver 809a, including communications to and from gateway 50 and the other devices shown in FIGS. 1A-B.

The mobile device 25 further includes a microprocessor, sometimes referred to herein as the host controller 802. A processor 802 is a circuit having elements structured and arranged to perform one or more processing functions, typically various data processing functions. Although discrete logic components could be used, the examples utilize components forming a programmable CPU. A microprocessor 802 for example includes one or more integrated circuit (IC) chips incorporating the electronic elements to perform the functions of the CPU. The processor 802, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in mobile device 25, other devices and server computers (e.g., gateway 50), network elements, etc.

Returning more specifically to the mobile device 25 example of FIG. 8, the microprocessor 802 serves as a programmable host controller for mobile device 25 by configuring device 25 to perform various operations, for example, in accordance with instructions or programming executable by processor 802. For example, such operations may include various general operations of the mobile device 25, as well as operations related to communications with luminaires 10A-N, wall switches 20A-N and other lighting system elements during commissioning, diagnostics and maintenance performed by the commissioning/maintenance application 22. Although a processor may be configured by use of hardwired logic, typical processors in mobile devices are general processing circuits configured by execution of programming.

The mobile device 25 includes a memory or storage system 804, for storing data and programming. In the example, the memory system 804 may include a flash memory 804a and a random access memory (RAM) 804b. The RAM 804b serves as short term storage for instructions and data being handled by the processor 802, e.g. as a working data processing memory. The flash memory 804a typically provides longer term storage.

Hence, in the example of mobile device 25, the flash memory 804a is used to store programming or instructions for execution by the processor 802. Depending on the type of device, the mobile device 25 stores and runs a mobile operating system through which specific applications, including commissioning/maintenance application 22 (which may be a web browser executing a dynamic web page) or a native application, run on the mobile device 25. Examples of mobile operating systems include Google Android, Apple iOS (I-Phone or iPad devices), Windows Mobile, Amazon Fire OS, RIM BlackBerry operating system, or the like. Flash memory 804a may also be used to store mobile configuration settings for different mobile applications or services executable at device 25 using processor 802.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement any other device functions associated with communications for commissioning, diagnostics and maintenance on mobile device 25. Program aspects of the technology may be thought of as "products" or "articles of manufacture" typically in the form of executable code or process instructions and/or associated data that is stored on or embodied in a type of machine or processor readable medium (e.g., transitory or non-transitory), such as one of the memories 804*a*, 804*b* of memory system 804, or a memory of a computer used to download or otherwise install such programming into the mobile device, or a transportable storage device or a communications medium for carrying program for installation in the mobile device 25.

In the example, the flash memory 804*a* stores applications for execution by the microprocessor-based host controller 802, typically through operation/execution of the device operating system. Of note, for purposes of the present discussion, the flash memory 804 stores a commissioning/maintenance application 22 as one of the programs for execution by the microprocessor 802. Execution of commissioning/maintenance application 22 by the microprocessor 802 configures mobile device 25 to perform a variety of functions, particularly to commission and maintain the lighting system elements over the wireless out of band channel 7. In the example, commissioning/maintenance application 22 also engages in communications with the gateway 50.

In the illustrated example, the mobile device 25 includes a secure component 800. The secure component 800 (e.g. a secure element or "SE") may be provisioned as a section within the memory 804 or may take the form of a universal integrated circuit card (UICC) located within the device 25. A common example of a UICC implementation of the SE 800 is a subscriber identity module (SIM). As discussed above, the SE provides secure storage for various identifiers associated with mobile device 25. The SE typically has a unique identifier and is provisioned for operation of the mobile device 25 by storage of a mobile directory number (MDN) and/or mobile identification number (MIN) assigned to the device 25 by the carrier network operator.

The secure component contains applications that use secure keys running inside the secure processor. Although similar to other applications, the applications for the secure processor are sometimes smaller and sometimes referred to as applets 843. In an example, commissioning/maintenance application 22 may be an applet residing in the SE 800. For example, there may be at least one applet 842 to engage in communications.

The mobile device 25 may include a variety of different types of physical user interface elements to interact with the commissioning/maintenance application 22. For discussion purposes, in the mobile device 25 shown in FIG. 8, the physical user interface elements of device 20 includes a touch screen display 820 (also referred to herein as "touch screen 820" or "display 820") to support gestures. For output purposes, the touch screen 820 includes a display screen, such as a liquid crystal display (LCD) or the like. For input purposes, touch screen display 820 includes a plurality of touch sensors 822.

A keypad may be implemented in hardware as a physical keyboard of mobile device 25, and keys may correspond to hardware keys of such a keyboard. Alternatively, some or all of the keys 830 (and keyboard) of device 25 may be implemented as "soft keys" of a virtual keyboard graphically represented in an appropriate arrangement via touch screen display 820. The soft keys presented on the touch screen display 820 may allow the user of device 25 to invoke the same user interface functions as with the physical hardware keys for authentication purposes.

In general, touch screen display 820 and touch sensors 822 (and one or more keys 630, if included) are used to provide a textual and graphical user interface for the mobile device 25. In an example, touch screen display 820 provides viewable content to the user at device 25. Touch screen display 820 also enables the user to interact directly with the viewable content provided in the content display area, typically by touching the surface of the screen with a finger or an implement such as a stylus.

As shown in FIG. 8, the mobile device 25 also includes a sense circuit 828 coupled to touch sensors 822 for detecting the occurrence and relative location/position of each touch with respect to a content display area of touch screen display 820. In this example, sense circuit 828 is configured to provide processor 802 with touch-position information based on user input received via touch sensors 822. In some implementations, processor 802 is configured to correlate the touch position information to specific content being displayed within the content display area on touch screen display 820. The touch-position information captured by the sense circuit 828 and provided to processor 802 may include, but is not limited to, coordinates identifying the location of each detected touch with respect to the display area of touch screen display 820 and a timestamp corresponding to each detected touch position. Accordingly, the processor 802 may determine input of a phone number, a token, or menu identifiers selected during audible scripts, for example.

FIG. 9A is a wireless advertising packet format for commissioning a lighting system element on a lighting control network via a wireless out of band channel. The wireless advertising packet 900 includes a one byte preamble 905, four byte access address 910, an 8-39 byte advertising/data channel protocol data unit (PDU) or payload 915, and a three byte cyclic redundancy check (CRC) 920. The advertisement packet 900 is sent in the clear by the lighting system element with no encryption as it carries no sensitive information. The wireless lighting control system determines the optimum advertising interval, which can be dynamically adjusted or a predetermined time interval (e.g., fixed or static time period). A scan request by a mobile device 25, for example, results in a scan response with a payload identical to that of the advertisement FIG. 9B is an exploded view of an advertising channel PDU 915 of the advertising packet of FIG. 9A. As shown, the advertising channel PDU 915 includes a two byte header 925 and a 6-37 byte payload 930.

FIG. 9C is an exploded view of a header 925 of the advertising channel PDU 915 of FIG. 9B. The header 925 of the advertising channel PDU 915 includes the following fields: a four bit PDU type 935, a two bit reserved for future use (RFU) 940, a one bit TxAdd 945, a one bit RxAdd 950, a 6 bit length 955, and a 2 bit RFU 960. The PDU type 935 indicates the advertising channel type, for example, ADV_IND (0000), ADV_DIRECT_IND (0001), ADV_NONCONN_IND, (0010), SCAN_REQ (0011), SCAN_RSP (0100), CONNECT_REQ (0101), and ADV_SCAN_IND (0110). Two payload types (SCAN_REQ and SCAN_RESP) will result in a scan request or response. The other four PDU types are advertising channel types The TxAdd 945 and RxAdd 950 fields indicate whether the advertiser or initiator are public, respectively. Length 955 indicates length of the payload 930 in bytes.

FIG. 9D is an exploded view of a payload 930 of the advertising channel PDU 915 of FIG. 9B. As shown advertising channel PDU 930 includes an ADV address 965 field. ADV address is the public or random device address of an advertising lighting system element. Lighting system element specific data goes into each of the AD [0 . . . N] index fields 970, 975, and 980.

FIG. 9E is an exploded view of an advertising index 970 of the payload 930 of FIG. 9D. As shown the advertising index 970 includes an AD length 985, an AD type 990, and an AD data 995 field.

Each of the advertising indices [0 . . . N] 970, 975, 980 are used to carry command-response schemes. However, some command-response messages can be too large to fit in the maximum payload portion of the payload transmission unit (20 bytes), therefore message fragmentation and re-assembly capability may be used for such command-response messages.

Some of the commands embedded in the advertising indices [0 . . . N] 970, 975, 980 include identification of a lighting system element (e.g., to blink or cease blinking), RF channel discovery (e.g., general request for channel discovery, progress indication, and actual RF channel selection), tuning RF power (tune RF power or progress indication), setting the lighting control network configuration (e.g., short MAC address), and setting the lighting control network address table (including defining lighting control group behavior).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A method comprising:
receiving, at a mobile device and from one of a plurality of lighting system elements, a packet via a wireless out of band channel, the wireless out of band channel:
being used for ancillary system functions related to diagnostics or maintenance of a lighting system; and
being separate and distinct from a band of a wireless lighting control network related to lighting control operation connecting the plurality of lighting system elements;
wherein the wireless out of band channel is a 2 gigahertz or higher radio band and the wireless lighting control operation band is a sub-gigahertz radio band;
establishing an out of band connection with the one lighting system element via the wireless out of band channel;
selecting, at the mobile device, an ancillary function to be performed by the one lighting system element, the ancillary function to be performed relating to the one lighting system element, another lighting system element, or the wireless lighting control network; and
upon performance of the selected ancillary function, terminating the established out of band connection.

2. The method of claim 1, wherein:
the ancillary function to be performed is a diagnostic function; and
the method further comprises:
sending, over the established out of band connection via the wireless out of band channel, a query to the one lighting system element; and
receiving, over the established out of band connection via the wireless out of band channel, a response to the query from the one lighting system element containing diagnostic information sent from the one lighting system element.

3. The method of claim 2, wherein the response to the query includes one or more of:
statistics related to performance of the one lighting system element;
statistics related to performance of the wireless lighting control network accumulated by the one lighting system element; and
statistics related to performance of the other lighting system element.

4. The method of claim 1, wherein:
the ancillary function to be performed is a maintenance function; and
the method further comprises:
sending, over the established out of band connection via the wireless out of band channel, a command to the one lighting system element; and
receiving, over the established out of band connection via the wireless out of band channel, a result of the command from the one lighting system element.

5. The method of claim 4, wherein:
the command is one of:
update;
restart; and
reset; and
the response is one of an indication of success or an indication of failure.

6. The method of claim 4, further comprising:
prior to sending the command, requesting, over the established out of band connection via the wireless out of band channel, a current configuration of the one lighting system element; and receiving, over the established out of band connection via the wireless out of band channel, the current configuration of the one lighting system element.

7. The method of claim 1, wherein the out of band connection is established with the one lighting system element via the wireless out of band channel while the lighting control operation continues to be performed via the wireless lighting control network.

8. The method of claim 1, wherein the packet received at the mobile device via the wireless out of band channel includes a preamble, an access address, a protocol data unit (PDU), and a cyclic redundancy check (CRC).

9. The method of claim 8, wherein the protocol data unit (PDU) includes a header and a payload, the payload including an advertising address.

10. A lighting system element comprising:
a dual-band wireless radio communication interface system configured for:
communication of lighting control operation information over a wireless lighting control network communication band of a wireless lighting control network; and
communication, over a wireless out of band communication channel different from the wireless lighting control network communication band, of information other than the lighting control operation information;
wherein the wireless out of band communication channel is a 2 gigahertz or higher radio band and the wireless lighting control network communication band is a sub-gigahertz radio band;
a processor;
a memory accessible to the processor; and
programming in the memory which configures the processor to:
transmit a packet via the wireless out of band communication channel to a mobile device;
establish an out of band connection with the mobile device via the wireless out of band communication channel;
receive, over the established out of band connection via the wireless out of band communication channel, an indication of an ancillary function to be performed, the ancillary function to be performed relating to the lighting system element, another lighting system element, or the wireless lighting control network;
perform the indicated ancillary function; and
after performing the indicated ancillary function, terminate the out of band connection between the lighting system element and the mobile device.

11. The lighting system element of claim 10, wherein:
the ancillary function to be performed is a diagnostic function; and
the programming further configures the processor to:
receive, as part of the indication, a query from the mobile device; and
send, over the established out of band connection via the wireless out of band communication channel, a query response to the mobile device.

12. The lighting system element of claim 11, wherein the programming further configures the processor to prepare the query response by including one or more of:
statistics related to performance of the lighting system element;
statistics related to performance of the wireless lighting control network accumulated by the lighting system element; and
statistics related to performance of the other lighting system element.

13. The lighting system element of claim 10, wherein:
the ancillary function to be performed is a maintenance function; and
the programming further configures the processor to:
receive, as part of the indication of the function to be performed, a command from the mobile device; and
send, over the established out of band connection via the wireless out of band communication channel, a result of the command to the mobile device.

14. The lighting system element of claim 13, wherein the programming in the memory further configures the processor to:
upon determining the command is an update command, perform an update of the lighting system element based on configuration information included as part of the indication of the ancillary function to be performed; and
upon a successful update, send an indication of success as the result.

15. The lighting system element of claim 13, wherein the programming in the memory further configures the processor to:
upon determining the command is a reset command, perform a reset of the lighting system element, the reset resetting the lighting system element to a pre-commissioned state; and
upon a successful reset, send an indication of success as the result.

16. The lighting system element of claim 13, wherein the programming in the memory further configures the processor to:
upon determining the command is a restart command, perform a restart of the lighting system element by cycling power provided to the lighting system element; and
upon a successful restart, send an indication of success as the result.

17. The lighting system element of claim 10, wherein the programming in the memory further configures the processor to:
receive, prior to receipt of the indication of the ancillary function to be performed and over the established out of band connection via the wireless out of band communication channel, a request for a current configuration of the lighting system element; and
send, over the established out of band connection via the wireless out of band communication channel, a response including the current configuration of the lighting system element.

18. The lighting system element of claim 10, wherein the out of band connection is established with the mobile device via the wireless out of band channel while lighting control operation continues to be performed via the wireless lighting control network.

19. A non-transitory computer readable medium comprising a memory embodying programming instructions, wherein execution of the programming instructions by a processor configures the processor to perform functions, including functions to:
receive, from one of a plurality of lighting system elements, a packet via a wireless out of band channel, the wireless out of band channel:
being used for ancillary functions for diagnostics or maintenance of the lighting system; and being separate and distinct from a band of a wireless lighting control network related to lighting control operation connecting the plurality of lighting system elements;

wherein the wireless out of band channel is a 2 gigahertz or higher radio band and the wireless lighting control operation band is a sub-gigahertz radio band;

establish an out of band connection with the one lighting system element via the wireless out of band channel;

select an ancillary function to be performed by the one lighting system element, the ancillary function to be performed relating to the one lighting system element, another lighting system element, or the wireless lighting control network;

send, to the one lighting system element and over the established out of band connection via the wireless out of band channel, an indication of the ancillary function to be performed, wherein the ancillary function is a diagnostic function or a maintenance function;

receive, from the one lighting system element and over the established out of band connection via the wireless out of band channel, a result of performance of the ancillary function; and upon receipt of the result, terminate the established out of band connection.

20. The non-transitory computer readable medium of claim 19, wherein the out of band connection is established with the one lighting system element via the wireless out of band channel while lighting control operation continues to be performed via the wireless lighting control network.

* * * * *